US012210548B2

(12) United States Patent  
Omland

(10) Patent No.: US 12,210,548 B2  
(45) Date of Patent: *Jan. 28, 2025

(54) COMPUTER IMPLEMENTED METHOD FOR QUANTIFYING THE RELEVANCE OF DOCUMENTS

(71) Applicant: PatentSight GmbH, Bonn (DE)

(72) Inventor: Nils Omland, Bonn (DE)

(73) Assignee: PATENTSIGHT GMBH, Bonn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,339

(22) Filed: Jun. 2, 2023

(65) Prior Publication Data

US 2023/0306046 A1    Sep. 28, 2023

Related U.S. Application Data

(63) Continuation of application No. 17/489,959, filed on Sep. 30, 2021, now Pat. No. 11,709,871, which is a continuation of application No. 16/504,132, filed on Jul. 5, 2019, now Pat. No. 11,151,173, which is a continuation of application No. 12/899,756, filed on Oct. 7, 2010, now Pat. No. 10,380,147.

(51) Int. Cl.
- G06F 16/30 (2019.01)
- G06F 16/93 (2019.01)

(52) U.S. Cl.
CPC .............. G06F 16/30 (2019.01); G06F 16/93 (2019.01)

(58) Field of Classification Search
CPC .................................................. G06F 16/30
See application file for complete search history.

(56) References Cited

U.S. PATENT DOCUMENTS

| | | |
|---|---|---|
| 5,991,751 A | 11/1999 | Rivette |
| 6,038,561 A | 3/2000 | Snyder |
| 6,202,058 B1 | 3/2001 | Rose |
| 6,285,999 B1 | 9/2001 | Page |
| 6,389,418 B1 | 5/2002 | Boyack |
| 6,526,440 B1 | 2/2003 | Bharat |
| 6,556,992 B1 | 4/2003 | Barney |
| 6,799,176 B1 | 9/2004 | Page |
| 7,058,628 B1 | 6/2006 | Page |
| 7,376,649 B2 | 5/2008 | Yang |
| 7,433,884 B2 | 11/2008 | Breitzman |

(Continued)

FOREIGN PATENT DOCUMENTS

| | | |
|---|---|---|
| EP | 1182578 | 2/2002 |
| EP | 1215599 | 6/2002 |

(Continued)

OTHER PUBLICATIONS

Trajtenberg, M., "A penny for your quotes: patent citations and the value of innovations" Rand Journal of Economics 21(1): 172, 1990.

Hall, B. H. A. Jaffe, et al., "Market Value and Patent Citations." Rand Journal of Economics 36(1): 16-38, 2005.

Zuniga P., Guellec E., Dernis H., Khan M., Okazaki T., Webb C., OECD Patent Statistics Manual. Paris: OECD Publications, 2009.

Deng Z., Lev B. Narin F., "Science & technology as predictors of stock performance" Financial Analysts Journal; 55(3): 20-32, 1999.

(Continued)

Primary Examiner — Dangelino N Gortayo  
(74) Attorney, Agent, or Firm — Dinsmore & Shohl LLP

(57) ABSTRACT

A computer system comprising a processor, graphical output means and a computer readable storage medium storing instructions that when executed by the processor cause the processor to perform a method for quantifying and aggregating the relevance of documents.

18 Claims, 9 Drawing Sheets

(56) References Cited

U.S. PATENT DOCUMENTS

| | | | |
|---|---|---|---|
| 8,065,307 | B2 | 11/2011 | Haslam et al. |
| 8,364,679 | B2 | 1/2013 | Resnick |
| 9,110,971 | B2 | 8/2015 | Liao et al. |
| 10,776,376 | B1* | 9/2020 | Coyle ............... G06F 16/382 |
| 2004/0010393 | A1 | 1/2004 | Barney |
| 2004/0220842 | A1 | 11/2004 | Barney |
| 2006/0059119 | A1 | 3/2006 | Canright |
| 2006/0074867 | A1 | 4/2006 | Breitzman |
| 2006/0106847 | A1 | 5/2006 | Eckardt, III et al. |
| 2006/0224974 | A1 | 10/2006 | Albrecht |
| 2007/0061297 | A1* | 3/2007 | Bihun ............... G06F 16/9538 |
| 2007/0073748 | A1 | 3/2007 | Barney |
| 2007/0088738 | A1 | 4/2007 | Barney |
| 2007/0094297 | A1 | 4/2007 | Barney |
| 2007/0150298 | A1 | 6/2007 | Barney |
| 2007/0276796 | A1 | 11/2007 | Sampson |
| 2008/0059448 | A1* | 3/2008 | Chang ................ G06F 21/62 |
| | | | 707/999.005 |
| 2008/0154767 | A1 | 6/2008 | D'Agostino |
| 2008/0243786 | A1 | 10/2008 | Stading |
| 2008/0243813 | A1 | 10/2008 | Liu |
| 2009/0234688 | A1 | 9/2009 | Masuyama et al. |
| 2009/0271274 | A1 | 10/2009 | Baunach |
| 2010/0114587 | A1 | 5/2010 | Masuyama et al. |
| 2010/0223258 | A1 | 9/2010 | Ghahramani et al. |
| 2020/0327172 | A1* | 10/2020 | Coquard ............ G06F 16/9035 |

FOREIGN PATENT DOCUMENTS

| | | |
|---|---|---|
| EP | 1505520 | 2/2005 |
| WO | 2007007898 | 1/2007 |
| WO | 2008094680 | 8/2008 |

OTHER PUBLICATIONS

Ernst, H., "Patentinformationen für die strategische Planung von Forschung und Entwicklung" Wiesbaden: DUV; 1996.

"BASF und Dow begrüßen neuen Patent Asset Index," Ludwigshafen, Deutschland und Midland, Michigan:12. Oct. 2009, available at http://www.basf.com/group/corporate/de/function/conversions:/publish/content/news-and-media-relations/news-releases/downloads/2009/P402-Patent_Asset_Index-d.pdf.

"Wissenschaftler der WHU entwickeln neuen globalen Innovationsbenchmark," available at http://www.whu-koblenz.de/cms/index.php?id=4888, retrieved on Oct. 22, 2010.

"Recent News: WHU scientists develop new global innovation benchmark," available at http://www.whu.edu/cms/whu/news/news/?L=1&tx_ttnews[tt_news]=3805&cHash=a5071be1d43691e188f977745bb6ca35, Oct. 26, 2009.

Harhoff, D., Scherer, F., Vopel, K. "Citations, family size, opposition and the value of patent rights," Research Policy; 32 (2003) 1343-1363.

* cited by examiner

| Company | Field Share: Share of total DFCR values of all document families belonging to a particular field and owned by company (1002) | Portfolio Strength: Sum of DFCI score values of protected inventions (1003) | Portfolio Size: Number of inventions protected by valid patents or pending patent applications (1004) | Average DFCR score values of all document families of the company's portfolio (1005) | Average DFLS values of all document families of the company's portfolio (1006) | Average DFCS values of all document families of the company's portfolio. (=Size of markets covered compared to US market size) (1007) | age: average age of the inventions in the portfolio (1008) |
|---|---|---|---|---|---|---|---|
| Company I | 17% | 34622 | 9823 | 3.5 | 1.9 | 1.7 | 8.7 |
| Company J | 16% | 31665 | 8697 | 3.6 | 1.9 | 1.7 | 9.4 |
| Company K | 14% | 27863 | 9709 | 2.9 | 1.8 | 1.3 | 8.7 |
| Company L | 8% | 16885 | 4556 | 3.7 | 2.1 | 1.6 | 10.2 |

COMPUTER IMPLEMENTED METHOD FOR QUANTIFYING THE RELEVANCE OF DOCUMENTS

RELATED APPLICATION

The present application is a continuation of application of U.S. patent application Ser. No. 17/489,959, filed Sep. 30, 2021 entitled "COMPUTER IMPLEMENTED METHOD FOR QUANTIFYING THE RELEVANCE OF DOCUMENTS" which is a continuation of application U.S. patent application Ser. No. 16/504,132, filed Jul. 5, 2019 entitled "COMPUTER IMPLEMENTED METHOD FOR QUANTIFYING THE RELEVANCE OF DOCUMENTS", which is a continuation of U.S. patent application Ser. No. 12/899,756, filed Oct. 7, 2010 entitled "COMPUTER IMPLEMENTED METHOD FOR QUANTIFYING THE RELEVANCE OF DOCUMENTS", the disclosures of which are expressly incorporated herein by reference in its entirety.

FIELD OF THE INVENTION

The present invention relates to the field of data processing, and more particularly to a computer implemented method for quantifying and densely displaying the relevance of documents. In particular, the invention relates to the field of quantifying the relevance of patent documents.

BACKGROUND AND RELATED ART

The amount of information being generated and made publicly available in the private, governmental and business sector has been tremendously increasing over the last decades. Meanwhile, in most spheres of business, it is not any more possible to keep up-to-date by reading all the documents available on a particular subject, This problem, also known as the problem of "information overload", has led to the development of several computer aided methods facilitating and accelerating the retrieval, organization and evaluation of all the available and relevant data on a particular subject.

The optimal method for determining the relevance of documents for a particular question depends heavily on the structure of the data objects comprising the information of interest. A continuum of structuredness exists reaching from highly unstructured data structures such as natural language text stored for example in the form of web pages to highly organized data forms, e.g. entries in relational databases, wherein data is stored in tables according to a particular, structured database schema.

Data being organized in highly structured data sources such as databases can be interpreted and processed by computers e.g. by applying appropriate retrieval requests such as SQL queries. However, it is a time consuming task for humans to develop a database schema suitable for the data that shall be represented and stored by said database and to construct appropriate queries for each particular subject field a user may be interested in. For this and other reasons, many documents which may be of relevance for a particular subject are never stored in a structured way and are stored as plain text instead, e.g. as html page available via the world wide web. In addition, not all relevant information of data objects may be explicitly present in the database but may be information implicitly derivable from the connectivity of document data objects relative to each other.

Plain text documents represent the other end of the continuum: natural language text is, although semantically rich, highly unstructured. It requires sophisticated natural language processing methods to enable a computer to extract meaningful information from plain text and to efficiently rank the relevance of text documents based on the plain text information. Due to these difficulties, methods trying to rank such highly unstructured documents often abstain from analyzing the documents syntactically or semantically and rather rely on evaluating topological properties of the network of documents. The topological information consists of links, e.g. citations. Such links are usually directed. Commonly, links are established by a document, the 'source document', citing one or multiple other documents, here referred to as 'destination documents'.

A data object representing a document may comprise additional meta-information. The meta-information comprises additional information on the document and may include pointers connecting the document data object to other document data objects, the pointers thereby acting as links.

In the following, the term 'linkage information' will be used to denote information on which document data object is linked to any other document data object. Links may be stored separately from the linked data objects, may be contained in the plain-text section or the meta-information section of the source document data object, destination document data object or both of them. A well known example for links within plain-text sections of documents are hyperlinks, e.g. URL hyperlinks. A Hyperlink is a reference to a document or a text section the user can directly follow, e.g. by clicking on an icon or a text phrase providing the hyperlink functionality (the hypertext).

The linkage information has been used to determine the relevance of documents, in particular of documents having only little meta-information and lacking a common, semantically rich data structure allowing a more advanced way of quantifying the relevance of documents represented by the data objects examined.

A method described in U.S. Pat. No. 7,058,628, also known as Google's 'page rank algorithm', assigns importance ranks to nodes in a linked database, such as any database of documents containing citations or the World Wide Web. The rank assigned to a document is calculated from the ranks of documents citing it. In addition, the rank of a document is calculated from a constant representing the probability that a browser through the database will randomly jump to the document.

A further technique to retrieve, rank and display data objects is described in U.S. Pat. No. 7,376,649. A global ranking value is herein assigned to a data object based on a combination of the object's link-based and text-based (e.g., word frequency) ranks. A 'link-based' rank is derived from a vector-space cluster analysis, a 'text-based' rank is derived from text features such as word frequency.

US2008243813 describes a method and system for calculating the importance of documents based on transition probabilities from a source document to a target document.

One type of document being of particular relevance for many companies and corporate consultants are intellectual property documents, e.g. patent documents, patent applications, utility patents and utility patent applications.

Various methods for evaluating the relevance of intellectual property documents are known which have, however, severe methodological shortcomings and lead to wrong or incomplete results. For example, Trajtenberg, M., 1990, describes in "A penny for your quotes: patent citations and the value of innovations" published in the RAND Journal of Economics 21 (1), obstacles arising from the use of patents in economic research. The obstacles are caused by the fact that patents vary enormously in their importance or value. Hence, simple patent counts cannot be informative about the innovative output of a company. Trajtenberg proposes to weight the patent counts by citations as indicators of the value of innovations, thereby overcoming the limitations of simple counts.

Hall, B. H., A. Jaffe, et al., 2005, explores in "Market Value and Patent Citations" published by the Rand Journal of Economics 36 (1): 16-38 the usefulness of patent citations as a measure of the "importance" of a firm's patents. Hall comes to the conclusion that each extra citation per patent boosts the market value of that patent by 3%.

Harhoff, D., F. M. Scherer, et al., 2003, describe in "Citations, family size, opposition and the value of patent rights" published in Research Policy 32 (8), 1343-1363 that the number of citations a patent receives is positively related to its value. References to the non-patent literature are informative only in some particular technology fields. Patents which are upheld in opposition and annulment procedures and patents representing large international patent families are particularly valuable.

US20070073748 describes a method for probabilistically quantifying a degree of relevance between two or more citationally or contextually related data objects, such as patent documents, non-patent documents or web pages. The relevance between two or more citationally or contextually related data objects is visualized by using iterative self-organizing maps ("SOM") generating a visual map of relevant patents which are to be explored, searched or analyzed.

U.S. Pat. No. 5,991,751 describes a data processing system maintaining first databases of patents and second databases of non-patent information of interest to a corporate entity. The system also maintains one or more groups comprising any number of the patents from the first databases. The system processes the patents in one of the groups in conjunction with non-patent information. Accordingly, the system performs patent-centric and group-oriented processing of data. A group can also include any number of non-patent documents. The groups may be product based, person based, corporate entity based, or user-defined. Other types of groups are also covered, such as temporary groups.

U.S. Pat. No. 6,556,992 provides a statistical patent rating method and system for independently assessing the relative breadth, defensibility and commercial relevance of individual patent assets and other intangible intellectual property assets. Said rating method provides means for patent valuation by experts, investment advisors, economists and others to help guide future patent investment decisions. It is described a statistically-based patent rating method and system whereby relative rankings are generated using a database of patent information by identifying and comparing various characteristics of each individual patent to a statistically determined distribution of the same characteristics within a given patent population.

SUMMARY OF THE INVENTION

The present invention relates to an improved, computer implemented method for quantifying and densely displaying the relevance of documents, in particular patent documents.

The expression 'densely displaying' encompasses the display of a plurality of data values in a summarized form which can quickly be comprehended by a user. As often the case, users need to extract information contained in a set of documents without manually considering these documents one by one. For example, a user may be interested in the overall relevance of a group of documents, e.g. a patent portfolio. In such cases densely displaying an aggregated relevance score of the documents can be preferable over e.g. displaying a long ranked list of documents. A user might also be interested in understanding the strengths and weaknesses revealed in a document portfolio such as a patent portfolio. By densely displaying the aggregated relevance of subsets of an overall portfolio, areas of strength and weaknesses can be discovered and quantified.

A significant, if not the largest proportion of the documents available today are represented by data objects whose structuredness is located somewhere in the middle of the continuum of structuredness: data objects representing said documents may contain a section of natural language text comprehensible only by a human or by a computer applying advanced NLP methods. However, said data objects in the middle of the continuum in addition comprise meta-information that can be used to group and evaluate a multitude of documents with the help of a computer. Further, those document data objects may comprise links in their plain-text or meta-information section connecting them to other document data objects.

Embodiments of the present invention make use of structured, explicit information being available for each document data object as 'meta-information' in combination with linkage information and external data to determine the relevance of a particular document family and the document data objects the document family comprises and to create a set of combined relevance score values which can be used to derive various aggregate relevance scores values on a large set of document families.

In the following, various procedural steps are explained on a conceptional level with reference to 'documents' and 'document families' to ease the understanding of the methodological principles. As a matter of course, the computer-implemented methods and procedures executing those tasks do not handle abstract concepts but rather physical data objects interpretable and processable by a processing device. Documents, document families and groups thereof are represented on the physical level as data objects and data structures of various kinds, and the present invention is not limited to a particular programming language or a particular database system.

The meta-information of data objects comprises various properties of the document data object and may be represented e.g. in the form of attributes of data objects or in the form of table columns in relational databases of a particular database entry. The data contained in the meta-information of documents and their corresponding data objects can be used for various classification tasks, e.g. for a classification by country, by technology field or by the document owner, e.g. a patent holder. A property of a document data object can, for example, comprise bibliographic information, such as the author, a publishing company, the title of the journal or book wherein a document is published, the publication date, the language, the country wherein the document has a particular status, or the legal status within said country. Legal documents such as patent documents may be valid in a limited set of countries only and their validity in each country may be limited to a particular period of time. A property may likewise specify the date of filing or publishing a patent, a priority date, a country code, the name of the company owning the patent, the inventor, and the like.

In the context of the present invention, the term 'external data' refers to data being indicative of a property of an object of the 'external world', said object of the 'external world' being different from the document whose relevance is to be determined. For example, the gross national income is 'external data' as it is a feature of a country, not a feature of a particular document or document data object.

A 'link', as used in the context of the present invention, is any kind of computer-interpretable, directed connection between data objects, e.g. edges connecting one data object node to another data object node in a directed graph wherein the nodes represent document data objects.

According to other embodiments of the invention, a link connecting document data objects may be implemented as a citation list stored e.g. as database table and connecting a citing document to one or multiple cited documents. In the following, a document data object containing a particular link will be referred to as source document data object of the link. The document data object to which the link points to will be referred to as destination document data object. Analogously, a document containing a particular link will be referred to as source document of the link and the document to which the link points to will be referred to as destination document. A link may be stored in the plain-text or meta-information of the source document data object, of the destination document data object, or both document data objects, or in a separate data object or data storage.

According to further embodiments of the invention, undirected connections between data objects are represented by two opposite directional connections and thus be each considered as two links.

The term 'documents' refers to electronic documents of various kind, for example, scientific, technical, business and/or legal documents, in particular patents, patent applications and technical or scientific publications. The documents are represented in the form of 'data objects'. Accordingly, 'meta information' of documents, 'document properties' and the like are represented e.g. as constants or variables of the data object representing the electronic document. The expression 'document families' also encompasses one or more data objects representing a family of documents sharing a particular property value or property value range.

The expression 'document data objects', or simply 'data objects' encompasses in the following any kind of data object which represents an electronic document. The document data objects can be implemented e.g. as data object instances of a particular class in a piece of software written, for example, in an object oriented language. A document data object may also be implemented as an XML document or an entry of a database or a similar data structure. A data object can be manipulated by means of a programming and/or database query language and comprises e.g. bibliographic data or other meta-information of the document, the text of the document and may also comprise information on other documents linking to said document or being linked by said document.

The term 'data aggregation' as used herein is any process in which information is gathered and expressed in a summary form. Data aggregation allows the gathering of information about particular data objects having been grouped together based on specific properties.

An 'aggregated view' is a view provided to a user, e.g. via a graphical user interface such as a computer screen or a print-out, on data having been aggregated for a particular group of data objects. An aggregated view presents some or all data contained in the aggregated data objects in a condensed summary form, thereby providing the user with an intuitive and quickly comprehensible presentation of all or some of the data contained in a multitude of aggregated data objects. Providing an aggregated view can comprise, for example, displaying the number of data objects aggregated, displaying an aggregated relevance score, or displaying any other form of aggregated data value, e.g. an aggregated data value having been derived by aggregating a particular property value of all aggregated data objects. The aggregated data value may be displayed as alphanumerical character, may be encoded by a color schema and/or may be encoded by using a set of predefined images or graphical objects such as squares, circles or the like. An aggregated view comprising one or more aggregated score values is, for example, a screen image of an electronic display or a printout displaying said aggregated score value. An aggregated view being derived from one or more aggregated score value is, for example, a screen image or printout, wherein the shape, color, and/or (in the case of the electronic display) dynamic behavior of the displayed graphical elements depends on the aggregated score value.

The term 'computer readable storage medium' as used herein encompasses any storage medium which may store instructions which are executable by a processor of a computing device. In some embodiments, a computer readable storage medium may also be able to store data which is able to be accessed by the processor of the computing device. An example of a computer readable storage medium include, but are not limited to: a floppy disk, a magnetic hard disk drive, a solid state hard disk, flash memory, a USB thumb drive, Random Access Memory (RAM) memory, Read Only Memory (ROM) memory, an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example data may be retrieved over a modem, over the internet, or over a local area network.

The term 'computer memory' or 'memory' as used herein encompasses a computer readable storage medium which is directly accessible to a processor. Examples of computer memory include, but are not limited to: RAM memory, registers, and register files of a processor.

The term 'computer storage' as used herein encompasses any non-volatile computer readable storage medium. Examples of computer storage include, but are not limited to: a hard disk drive, a USB thumb drive, a floppy drive, a smart card, a DVD, a CD-ROM, and a solid state hard drive. In some embodiments computer storage may also be computer memory or vice versa.

The term 'computer system' as used herein encompasses any device comprising a processor. The term 'processor' as used herein encompasses any electronic component which is able to execute a program or machine executable instructions. References to the computing device comprising "a processor" should be interpreted as possibly containing more than one processor. The term 'computer system' should also be interpreted to possibly refer to a collection or network of computing devices each comprising a processor. Many programs have their instructions performed by multiple processors that may be within the same computing device or which may be even distributed across multiple computing device. The term 'computer system' may be interpreted herein as being a 'computing device.'

The objective of embodiments of the present invention is to provide an improved computer-based method for the quantification and the aggregated display of the relevance of documents for a particular purpose or criterion.

In a further aspect, it is the objective of embodiments of the present invention to provide an improved method for the quantification of the relevance of documents for which meta-information and information on its connectedness to other documents via links is available. As the 'relevance' of each piece of information may depend on the user and the particular goal of executing the relevance calculation, in a further aspect it is the objective of embodiments of the invention to provide means to flexibly evaluate the relevance of a large set of documents, wherein the categorization of documents is executed based on a multitude of different criteria specifiable by the user.

In a further aspect, the information gathered from a multitude of documents is displayed in a dense and intuitively comprehensible way. The problem of information-overload shall be resolved for any kind of document, in particular patent documents, by pointing the user to the most relevant documents and by providing a method to densely display the results to a user in the form of an 'aggregated view'.

Electronic displays and paper-based printouts are of limited size. Providing the results of an aggregating function, e.g. an aggregating score in the form of an aggregated view is highly advantageous as it allows to provide a user with in-depth, comprehensive data that can quickly be comprehended.

By ranking documents and calculating an aggregate relevance score from meta-information and linkage information derived from multiple documents allows a user (whose time and information processing capacity is always limited) to quickly comprehend the essence of the information contained in a collection of documents also when the size of the collection is very large (e.g. more than 1,000,000 documents).

In one aspect, the invention provides a computer implemented method for quantifying and aggregating the relevance of documents, the documents being represented by document data objects, the method comprising:
  assigning documents to one or multiple document families, each document family comprising one or multiple documents;
  calculating, for each document family, a document family coverage score DFCS, the document family coverage score being indicative of the validity of the document family in a category, whereby the validity is calculated from one or more properties of each document belonging to said document family;
  calculating, for each document family, a document family linkage score DFLS, said document family linkage score being calculated by
    finding one or more document links, each document link connecting a source document to a destination document, each destination document belonging to said document family, each source document belonging to another document family,
    finding one or more document family links, whereby each document family link connects a source document family with said document family, said document family acting as destination document family, wherein the existence of each document family link is derived from the one or more found document links and wherein the DFLS is derived from the existence and weight of the one or more found document family links;
  calculating, for each document family, a document family combined relevance score DFCR by multiplying the document family coverage score DFCS and the document family linkage score DFLS having been calculated for each document family;
  grouping document families into one or more portfolios, each portfolio comprising one or more document families;
  displaying, for each document portfolio, an aggregated view, the aggregated view comprising or being derived from one or more aggregated score values, the one or more aggregated score values being calculated by applying an aggregating function on the DFCR, the DFLS, or the DFCS value of the one or more document families of said portfolio.

One example for a document type for which an aggregated view can be provided are patent documents. Often, significant differences between the patent portfolios of competing companies exist, as companies may follow different strategies in filing patens (maximizing the total number of patens or maximizing cost efficiency by filing only the most promising inventions), and as companies may not all be involved in R&D to the same extent or may employ R&D teams of different inventive skill. Existing patent ranking methods are hampered by the fact that neither the linkage information alone nor the information explicitly stated in the data objects provides sufficient information to rank patent documents according to their true relevance to the user.

In still a further aspect, it is an objective of embodiments of the present invention to provide an improved method for reliably benchmarking patent portfolios.

Providing an improved patent benchmarking approach is only one of a multitude of embodiments of the present invention. Other embodiments of the invention exist for other document categories, e.g. technical documentations, newspaper articles, medical records and the like. To simplify matters, and without limiting the spirit and scope of the invention to patent documents, the general principles of the invention are elucidated in the following by embodiments having been specially adapted for the purposes of patent portfolio benchmarking. Those skilled in the art will know how to apply the teachings revealed in this document to rank sets of documents of other types which are also represented by interlinked document data objects comprising meta-information.

The objectives mentioned above are solved by the features of the independent claims. Preferred embodiments of the invention are given in the dependent claims.

According to preferred embodiments of the invention, the accuracy of determining the relevance of documents is improved by taking into consideration the meta-information of the document data objects as well as linkage-based information. The improvement is particularly significant for documents having been published recently. Recently published documents have usually been cited only scarcely and have, accordingly, only a small 'linkage score' or 'link-based relevance score', as a linkage score in general correlates with the number of other documents citing a particular document. By taking into consideration meta-information in addition to a link-based relevance score, the accuracy of calculating a relevance score is improved.

According to further embodiments of the invention, meta-information of the document, linkage information of the document and external data is used as input for calculating an aggregated relevance score value.

Patents are legal rights granted by governments in order to both stimulate inventions and their disclosure to the public. A patent is a legal device that grants an inventor market exclusivity over a new invention. As patents are granted by national law, they are only valid within the respective country. In all countries wherein the patent is not valid, the invention can be freely imitated by competitors. Usually, the patent application is filed only in a very limited set of countries in order to reduce costs. Further, the application may have been rejected by the patent offices of some of the countries. For said reasons, the legal protection of an invention is usually effective in only a fraction of world markets.

In the following, the term 'patent' and 'patent document' should be considered as referring to any kind of intellectual property right document, including patent document, patent applications, utility patents and utility patent applications.

Some users will perceive the relevance of a patent in their application context to be intimately related to the patent's economic value. Due to the extreme variance of economic value of different patents (the 20% most valuable patents represent 90% of total patent value), an estimate of the economic relevance of a patent portfolio simply by counting the number of patents does not suffice even for portfolios of large size. In several studies it has been shown that the number of citations received by a patent could be used as indicator of the economic relevance. However, there is usually a time delay of several years between the publication of a patent application and its first citation establishing a link between the citing source document and the cited destination document. Many patents may not be cited at all during their whole validity period. Solely 'link-based' or 'citation-based' methods for determining the relevance of a set of patent documents therefore will produce unrealistically low scores for recently published patent documents. As a result, a purely link-based approach may be biased in favor of older patent documents which may not necessarily be more relevant. This problem is an obstacle to any citation based relevance estimation and not limited to the relevance ranking of patent documents: whenever a score is derived based on the number of other documents linking to a particular document and wherein in addition the number of links depends on the age of the linked document (as the case with any citation based links), there exists a bias in favor of older documents.

According to further preferred embodiments of the invention, the accuracy of determining the relevance of documents is further improved by taking into consideration external data. A combined relevance score is calculated based on the link-based, the document data-object based and external data based information. Depending on the embodiment of the invention, the document data object based information comprises meta-information of the document data objects and/or information being contained in the document text and or information being derived by processing the meta-information and/or document text information. This approach is particularly advantageous, as it allows, for example, to normalize the relevance score according to one or multiple reference parameters which may vary in the course of time.

If, for example, the economic impact of a set of patents belonging to one patent family is to be calculated, one possibility to do this would be to count the number of patens being valid in different countries. The larger the number of countries wherein a patent of the family is valid, the higher the economic relevance of said patent family. According to a further embodiment of the invention, the accuracy of the calculated score is improved by considering, for each country, its significance for the given aggregation task. The significance can be measured, for example, based on the gross domestic income GDI or a similar figure being representative of the economic power of a country. The annual GDI figures used for the country specific weighting may change over time. Deriving the data from an external source, e.g. the World Bank, on a regular basis does not only improve the accuracy of the relevance score but in addition provides means to adapt the relevance score calculation to changes in the external settings being relevant for the score calculation.

Depending on the implementation, the external data used to calculate the score may be stored as part of the meta-information. Still, in the context of the present invention, such data will be referred to as 'external' as it comprises data being indicative of a property of an object of the external world, and not of a document data object it may be stored in, for example the GDI of a particular country. Typically, but not necessarily so, said external data is derived on a regular basis from external data sources, e.g. governments or national or international organizations like banks, insurance companies or health organizations.

According to a further embodiment of the invention, the external data may be supplemented or replaced by company-private data. Company-private data may be useful for a company to further adapt the portfolio relevance analysis to its particular needs, thereby increasing the accuracy of the aggregated score calculation. For example, the GDI is in general considered as good indicator of the economic power of a country. In case a company executing a portfolio analysis is in possession of other indicators being of higher relevance for the purposes of the company, the company may use this indicator instead of the GDI. For example, if the company develops and sells pharmaceutical products and is in the possession of turnover figures for pharmaceutical products in all economically relevant countries of the world, the accuracy of the portfolio analysis may be further improved in respect to the needs of the company by using the pharmaceutical turnover figures instead of the GDI. The feature of allowing a user to specify the kind and content of external data used for normalizing the relevance scores provides the benefit that the significance of each particular country, e.g. from the economic angle, which may vary greatly depending on each respective business sector or technology field, can be far better estimated based on company or business sector specific weights than on highly general indicators of economic relevance such as the GDI.

By combining selected properties of the document data object, e.g. the country a patent document is valid in, with external data, such as the GDI of that country, it is possible to improve the accuracy of the calculated relevance score.

Documents are grouped into document families before the document family linkage score and the document family coverage score is calculated whenever applicable.

According to a preferred embodiment of the invention, a method for quantifying and aggregating the relevance of documents is provided which is based on the specification of one or more document families and the calculation of three relevance score values:

The 'document family linkage score' DFLS in the context of the present invention is a relevance score value having been calculated for a particular document family, the relevance score value being indicative of the frequency and quality of links, e.g. citations, pointing to documents of said particular document family.

The 'document family coverage score' DFCS in the context of the present invention is a relevance score value having been calculated for a particular document family, said relevance score value being indicative of the coverage of the document family in respect to a particular category. The coverage of a document family of a particular category can be determined, according to embodiments of the invention, by determining the value of a property assigned to each document of a document family and by calculating a DFCS score for a document family in dependence of the property values of each document in said document family. For example, a category for which the coverage of a document family shall be determined, can be a geographic region, e.g. one or more continents, an economic zone or a particular selection of countries. Depending on the embodiment, the property can be indicative of political, economic or geographic properties having been assigned to a document of the document family.

According to some embodiments, said property is indicative of the status, e.g. the legal status, of a document in a particular country. According to some embodiments, the determined document family coverage value is weighted based on the impact of each entity represented by said property for the respective document aggregation task. For example, in case the properties used for calculating the DFCS score of a document family are country-specific weights, a country-specific feature being indicative of the impact of said country for the aggregation task could be the GDI of the country being indicative of its economic strength.

The 'document family combined relevance score' DFCR in the context of the present invention is a relevance score value being calculated for a particular document family as the product of the DFCS and the DFLS values of said document family.

According to embodiments of the invention, any of said three score values calculated for a document family and can be assigned to each document contained in the document family for which the scores were determined. Said assigned relevance score value is used as the 'relevance score' or 'rank' of a document. This rank may be used to retrieve and display documents ordered according to their rank, the rank being indicative of the relevance of a particular document for a particular question.

According to further embodiments, a ranked list of document families may be provided and displayed in addition to or instead of a ranked list of documents. Given a display of a limited size, the display of the highest ranking documents or document families on the screen assists a user in reading and evaluating only the most relevant documents.

According to some embodiments, the documents are patent documents and the document families are patent families representing an invention. The set of documents whose relevance is to be determined is a set of patents held by a company. In case the user wants to retrieve the most relevant patents of the company, he may apply the method in order to retrieve a list of patens ranked e.g. by the patent family combined relevance score DFCR of the patent family the patent documents belong to. The list shows the most relevant patents on the top. Alternatively, the user may choose other subsets, e.g. a set of patent documents belonging to a particular technology field, a set of patent documents having been filed by a particular department of the company or being valid within a selected period of time or a selected set of countries.

Alternatively or in addition to calculating the DFLS, the DFCS or the DFCR scores of all document families of a particular set of documents, e.g. a document portfolio, derivative score values may be calculated.

A 'portfolio' encompasses a set of document families whose documents share at least one common property, e.g. the technology field, the company owning/holding a document, a period of time or a particular country within which a document is valid. In case the documents are patent documents and the portfolio is created by grouping all patents held by the same company into one portfolio, the application of the method results in an improved method for evaluating the competitive strength of a patent portfolio of a particular company.

A derivative data value is a data value having been obtained by applying a mathematic function on another data value. According to further embodiments, derivative relevance score values are calculated which are:

The portfolio size PSI=Number of document families of a portfolio having a DFCS value larger than 0.

The portfolio strength PST=Sum of the total DFCR score values of all documents in the portfolio.

The field share FSH=Ratio of the sum of the DFCR score values of all document families of a portfolio to the sum of the DFCR score values of a superset of document families, whereby all document families considered in said calculation belong to a particular field for which the FSH value is calculated. The superset of document families can be, for example, the totality of document families examined. The FSH may further be refined by considering only document families being valid at a particular sheet date or meeting any other condition.

$$FSH = \sum (DFCR_{i1u}, \ldots, DFCR_{inu}) / \sum (DFCR_{j1u}, \ldots, DFCR_{jnu}),$$

wherein the portfolio i may, for example, represent all documents of a particular person or company, u may represent the field considered and j may represent a larger set of documents, for example all documents examined. A 'field' as used herein can be any property assigned to a document family, for example, a technology field, an inventor or author, or the like. Each document family may have assigned multiple data values per field. For example, the field 'technology field' of a document family can have assigned multiple different technology fields, for example if the document relates to different technological fields such as 'genetics' and 'microbiology'. At least some types of fields of a document family are also assigned to the documents of said family. According to some embodiments, all documents of a document family are assigned the technology field assigned to the document family.

The portfolio linkage score PLS=Average DFLS of all document families of a portfolio having an DFCS value larger than 0.

The portfolio coverage score PCS=Average DFCS of all document families of a portfolio having an DFCS value larger than 0.

Said score values have been observed to be particularly suited for accurately representing various aspects of the relevance of a document family.

According to a further embodiment, by executing a drill-down analysis, the FSH value or any other aggregate document family score may be determined for a subset of document families belonging to a particular person or company, belonging to a particular technology field and/or being valid at a particular sheet date, or any other sub-sets of document families. A drill-down analysis is a specific analytical technique whereby the user navigates among levels of data ranging from the most summarized (up) to the most detailed (down). During a drill-down analysis, a currently evaluated sub-set of document family is considered as current portfolio for which said derivative relevance scores, e.g. PSI, PST or FSH can be calculated.

Instead or in addition to displaying a list of ranked document families, the aggregated score value may be displayed graphically, e.g. on the screen of a computing device such as a computer or a mobile phone, or as printout. The information may be displayed on the same machine where the document relevance scores were calculated or presented on a remote screen via a network, e.g. by presenting the results on an HTML page accessible via the Internet by a browser of a client machine.

According to a further embodiment, the total set of documents is pre-processed in a filtering step to filter out all those documents which do not meet various quality criteria, e.g. in regard to completeness, consistency or the type of the document and its properties. Thus, only documents meeting some quality requirements will be used for calculating the relevance scores DFLS, DFCS and DFCR.

According to a further embodiment, the documents are patent documents and derived by parsing XML files obtained from the DOCDB and INPADOC-PRS of the EPO. The INPADOC-PRS database is part of the European Patent Office's European Patent Information and Documentation Systems Directorate and comprises legal status information of multiple authorities. The legal status codes issued by various patent offices are mapped to universal legal codes stored in additional, internal data bases.

In the following, the steps for providing a user with an aggregated view according to various embodiments of the invention will be explained in greater detail.

1. Assigning Documents to One or Multiple Document Families, Each Document Family Comprising One or Multiple Documents.

According to embodiments, the documents can be dynamically queried from one or more document sources, e.g. data bases, files, the internet or the like. For many document types, in particular patent documents, a grouping of closely related documents into document families is advantageous for several reasons. At first, calculation time may be reduced as the number of document families typically is smaller than the number of documents. Further, this step reduces the variance between the examined data objects (document families are compared, not single documents) as the data basis for each document family becomes larger. Depending on the type of document processed, there may be additional beneficial aspects. In the case of patents, for example, documents are preferentially grouped into patent families. A grouping of documents into patent families is advantageous as all documents of a patent family may represent the same invention. Taking a whole patent family instead of a single patent document as the basis for calculating relevance scores helps to reduce systematic biases, e.g. towards patents from one authority, and the influence of singular events and outliers;

The grouping of documents into document families depends on the type of document to be processed and on the kind of information considered as 'relevant' by the respective user. In case the documents are technical documents, technical documents of different versions may be grouped together if they relate to the same device. In case the documents are legal documents, documents may be grouped into the same document family if they share the same case number.

In case the documents are web pages, books, articles or texts and the user is interested in the extent of the potential audience then documents may for example be grouped into one document family if they contain the same content but are written in different languages. Similarly, if the user is interested in the extent or diversity of discussion or knowledge on a particular topic, then documents may be grouped into one document family if they share the same topic.

According to some embodiments, clustering or classification algorithms are used to group documents into document families. A multitude of other grouping options exist. A person skilled in the art knows how the grouping of documents into families may be adequate in each particular use case scenario.

2. Calculating, for Each Document Family $DF_{Dest}$. A Document Family Coverage Score $DFCS_{DFDest}$.

The DFCS is indicative of the coverage of the document family in a particular category.

According to embodiments, the coverage of a document family is calculated from at least one property of its documents.

According to embodiments of the invention, the calculated DFCS is indicative of the coverage of the document family in any user-selected category. For example, if the user is interested in the extent of the potential audience of the document family, the coverage can be calculated based on the document property 'language'. In this case, the calculated DFCS will be indicative of to what extent a certain document family comprises documents in different languages.

According to further embodiments, in case a user is interested in the extent or diversity of discussion on a particular topic, the DFCS score is calculated for a document family based, for example, on the properties 'document length', 'publisher', 'author', 'geographic origin' or the like of each document contained in said document family. A person skilled in the art knows how the document property or document properties of the documents of a document family may be adequately chosen in a particular use scenario for calculating the coverage of a user-selected category by a document family.

According to some embodiments, the impact of a document in respect to a particular category is expressed by means of a weighted score wc. According to some embodiments, said weighted score is indicative of the validity of a document in a particular country.

According to other embodiments, said weighted score wc is indicative of the size of the potential audience being able to or being expected to read a language of a particular document. For example, if a user is interested in the extent of the potential audience of document families the language coverage of the document family can be calculated from the individual documents by assigning each document a property in the form of a weighted score wc indicating the size of the potential audience being able to or being expected to read that language. Likewise, the publishing coverage of a document family can be calculated for example based on the document property 'publisher' of documents in the document family, whereby said property is weighted by the reach of each publisher in terms of readers. A person skilled in the art will know how the weights may be adequately chosen in a particular use scenario.

In some embodiments the DFCS is indicative of the geographic coverage, e.g. the validity of a document family in a geographic territory within which said documents of the document family are valid. The validity is derived from at least one property of the document. The validity of the document family is calculated from the validity of the documents belonging to said document family and having assigned as property an identifier of a particular country. The geographic territory is, for example, a geographic region comprising multiple countries.

According to preferred embodiments, each documents has assigned multiple different properties, thereby allowing the calculation of a DFCS score value for different categories of interest.

In the following, an embodiment calculating the validity of a document family for a geographic territory (territory) will be described in greater detail which is based on the validity of each document in a particular country.

For example, if the documents are patent documents, their validity, i.e. their legal status in a particular country or probability of obtaining a particular legal status in said country, are used to calculate the validity of the patent family in a set of countries, e.g. a continent. According to said embodiments, each document is assigned a country identifier as property, said country being, for example, the country in which said document was published or filed as patent application. A document is valid in said assigned country at a particular sheet date, if the sheet date is later than the filing date of the patent and the patent has not yet expired or has been invalidated for other reasons. In case the patent cites another patent as priority patent, the filing date of the priority document may be taken instead of the filing date of said patent.

According to embodiments of the invention, the validity of a patent in a country c is expressed by means of a weighted score $w_c$. The weighted score $w_c$ is a weight being indicative of the probability that a patent is or will be granted for a patent document.

According to some embodiments, the score $w_c$ indicates, whether document DOC belonging to document family b is valid, invalid or pending at the sheet date in country c. In case a document DOC belonging to document family b is valid in country c at sheet date, then the document family b is valid in country c at sheet date. A patent document has pending legal status in a country if the date of filing the document is <=sheet date, and if sheet date is <date of expiration of the patent document, and if the granting date >sheet_date or no granting date was assigned at all.

Depending on the status of a patent document in a particular country, different score values may be assigned to the document.

According to one embodiment, the score $w_c$ is 1, if first day of validity of document DOC in country c<=sheet date <date of expiration of document DOC, 0.7, if the filing date of document DOC in country c<=sheet date <date of expiration of document DOC, and if in addition DOC was not assigned a granting date yet, 0, if sheet date >=expiration date of document DOC or sheet date <first day of validity of document DOC. The first day of validity can be, for example, the day of priority of the patent document.

Said scores are indicative of the probability of obtaining legal protection for a patent document. Said score may be 1 for granted and currently valid patents and 0 for invalid patent documents.

In case the document is a patent document, the first day of validity is the date of priority of the patent based on DOC and the date of expiration of document DOC is the day at which a patent becomes invalid in a country because it has expired, was annulled or lost legal protection for any other reason.

If document family DF1 comprises the documents DOC1, DOC2 and DOC3, wherein DOC 1 was valid in France at sheet date while DOC2 was valid in the USA at sheet date and DOC3 was filed in Germany and was invalid at sheet date, then the patent family DF1 was valid in France and the USA at sheet date.

Said embodiment is particularly advantageous for documents representing patent applications. If a patent has expired or has become invalid for other reasons, the weighted score $w_c$ is 0. In case it is valid, the score is 1. In case the patent application has been filed in a particular country, the average probability of obtaining protection by law, which is currently about 70%, is used as weighted score as long as the decision if a patent right will be granted is pending.

According to further embodiments of the invention, other probability values, e.g. country specific, company specific or technology field specific probability values of obtaining a valid patent can be used instead of '0.7' and '1'.

According to a preferred embodiment, EP patent applications are treated as patent applications having been filed in all EP states until they are either granted a patent or finally rejected. WO-applications are treated within a certain period, e.g. the first 40 month, after filing as patent applications filed in all PCT states. If a country is covered by a national as well as an EP and/or a PCT patent application, the country is considered only once while calculating the PFCS.

According to a preferred embodiment of the invention, the significance of a property, e.g. the economic power of a country, is considered in addition and a score $wp_c$ being dependent on said significance is calculated. According some embodiments, the $wp_c$ value is calculated for a particular document DOC and a particular country c by weighting the $w_c$ value in dependence on the impact of country for the particular aggregation task, e.g. in dependence on the economic power of a country:

$$wp_c = \frac{w_c^* GNI_c}{GNI_{REF}}$$

wherein $GNI_c$ is a parameter being indicative of the impact of a country c. $GNI_c$ can be, according to embodiments of the invention, the gross national income of a country c.

wherein $GNI_{REF}$ is a parameter being indicative of the significance of a reference country, e.g. the gross national income of the USA, wherein $w_c$ is a weight being indicative of the legal status of document DOC belonging to document family b in country c at sheet date.

According to embodiments of the invention, the document family coverage score DFCS is calculated for each document family b as the sum of the $wp_c$ values assigned to all documents DOC of the document family b and for all countries considered. The term 'all countries considered' encompasses, according to some embodiments, all countries having been assigned to any of the documents DOC. According to further embodiments, a sub-selection of countries is considered for calculating the DFCS value of the document families. According to embodiments, the DFCS value of a document family b is calculated as:

$$DFCS_b = \Sigma(wp_c)$$

In terms of a less condensed formula:

$$DFCS_b = \Sigma([w_c * GNI_c]/GNI_{REF})$$

wherein Σ indicates the sum over all documents of document family b and for all considered countries c.

According to some embodiments, the $w_c$ value used for calculating a country-impact-specific $wp_c$ value is calculated as described previously, i.e. based on a weighting of each document according to its legal status in a particular country. Said embodiments are particularly advantageous for patent documents.

According to other embodiments, the $w_c$ value used for weighting and calculating a $w_{pc}$ value and a final DFCS value is a constant being equal for all documents of a document family, a data value being derived from a property of the document, or a data value being indicative of the significance of the document, e.g. in respect to a particular technology field.

According to some embodiments, each value being indicative of the significance of a country can be replaced by a user-specific value. According to some of said or other embodiments, a reference parameter $GNI_{REF}$ can be selected or specified by the user via the graphical user interface. For example, a user may load a set of sales figures achieved by his company in each country c into the computer system, e.g. by reading a plaintext file comprising the sales figures. Said country-specific sales figures are then used instead of the gross national income GNI for determining the country-specific significance of a document. The user may select another country as reference country instead of the USA, e.g. via a checkbox list or a drop-down list. He may also manually specify the reference value, e.g. specify a particular imaginary annual sales figure considered as reasonable reference value.

3. Calculating, for Each Document Family b, a Document Family Linkage Score DFLS.

The DFLS of a particular document family is derived from one or more document links, each document link pointing from a source document of a source document family to a destination document of said document family. Said particular document family acts as destination document family.

In case two document families A and B each comprise one or more documents acting as source documents and pointing to a destination document of the respective other document family, the two document families A and B are connected to each other via two document family links, one pointing from A to B, and one pointing from B to A.

According to further embodiments of the invention, the document links are predefined or defined dynamically, each document link being selected from the group comprising:
hyperlinks,
pointers connecting data objects,
adjacency matrices,
document citations and document references mentioned within the text of a document, and
document citations and document references contained in the meta-information of a document.

A pointer as used herein is a memory address connecting a first and a second data object. An adjacency matrix is a matrix of document identifiers specifying which document cites or links to another document. Any kind of electronic representation of a citation or reference mentioned within a document text or the meta-information of a document and pointing to another document can be considered, according to embodiments of the invention, as document link.

Depending on the embodiment of the invention, a document link may be explicitly specified and stored in a data storage area within or outside an electronic document or it may be dynamically calculated and determined during the execution of a method based on various statistical, natural language processing-based, or machine learning based techniques which are able to detect a relation between two documents. Such a relation may be, for example, a dynamically calculated similarity score, a co-citation relation, or the like.

According to embodiments of the invention, the document links used to derive the document family linkage scores are weighted. According to some embodiments, the weight α of a document link is derived based on the 'linkage quality' or 'citation quality' in case a link was specified in the form of a citation.

According to some embodiments, the document linkage weight is derived from a data value being indicative of the quality of the citations or links issued by an instance such as, e.g. a patent office or a particular patent examiner citing prior art documents as the result of a search. It is assumed that the higher the average number of links introduced per source document by the link issuing instance, the lower the relevance of each single link or citation. Accordingly, the document linkage weight value is inversely proportional to the average number of cited documents of said patent office.

According to further embodiments of the invention, each document link is weighted according to the field the source document belongs to, e.g. the technology field. Links, e.g. citations, are considered less relevant for fields wherein it is common to cite a multitude of not necessarily closely related documents.

According to further embodiments, a citing authority specific quality value is used as document linkage score value, said citing authority specific quality value being indicative of the authority having cited a particular document. Said authority can be, for example, an inventor, an examiner or a $3^{rd}$ party;

According to further embodiments, a document linkage score value is calculated based on a citation category of the destination document. A destination patent document is a patent document being cited. Such citation categories are, for example, the 'A', 'Y' and 'X' classes used by the International patent office to classify the documents retrieved in a search, whereby 'A' indicates low relevance, 'Y' as only partial relevance and 'X' a high relevance.

According to further embodiments, a quality value being derived from a further property of the source document is used to calculate the document linkage weight α. Said property-derived quality value is indicative of the relevance of said document for a user. For example, if the citation quality was determined to be particularly high in a determined time frame, said time frame information may be used as document linkage quality weight. According to other embodiments, a further property value of the destination document is used to calculate said document linkage weight. For example, said property can be the size of an organisation, the validity of a document in a particular market place or the identity of the document owner, e.g. of a competitor.

According to further embodiments, the field of the source document is used to determine the document link quality value. Said quality value is inversely proportional to the average number of documents cited by a document having assigned said field.

According to further embodiments, the field of the source document and the field of the destination document are used to determine the document link quality value. Said quality value is proportional to a predefined or dynamically calculated similarity score, the similarity score being indicative of the similarity of the source document and the destination document. For example, if the cited document DOC1 belongs to the technology field 'genetic engineering', a first citing document DOC2 belongs to the technology field 'mouse genetics' and a second citing document DOC belongs to the technology field 'Telecommunications', than the quality value for the document link DOC2→DOC1 will, depending on the embodiment, be higher or lower than DOC3→DOC1 as the technology field of DOC1 is closer to that of DOC2 than to DOC3.

According to further embodiments, the weights of the document links are directly derived in dependence on a particular technology field. At first, each document link is assigned to one or more technology fields. Depending on the embodiment, this assignment can comprise: assigning the technology field of the source document to the document link; assigning the technology field of the destination documents to the document link; assigning the technology field shared by the source document and the destination documents to the document link. In a second step, each document link is assigned the technology specific weight, said weight being indicative of the relevance of the respective technology field for the user.

In the following, an embodiment of the invention calculating the document linkage score based on the citation quality of patent offices shall be described.

At first, citation statistics for all relevant national and international patent offices are determined.

Each citation statistic comprises information on the average number of cited prior art documents for each patent document examined by a particular patent office o and being published in a particular period of time, e.g. a calendar year y. Each link connecting a source document d1 with the cited prior art document d2, d2 acting as destination document, is considered as 'document link'. According to some embodiments of the invention, cited documents not being patent documents, e.g. scientific publications or textbooks, are ignored.

If, for example, patent office o1 published 4000 patent documents in 2004, said documents comprising 12000 citations of prior art documents, the average citation per published patent document of office o1 is 3. Another office may have published 6000 patent documents in the same year which in total comprise 24000 citations of prior art documents. The average citation per published patent document is 4 for office o2. As office o2 cites more prior art documents per patent document than office o1, it is assumed that each single citation issued by office 1 is focused on a more specific and more relevant set of documents. Accordingly, the document link quality value of links being based on citations of office o1 is higher than for office o2.

Other embodiments of the invention use related approaches to assign weights to document links. A person skilled in the art will choose a method of assigning weights to documents appropriate to the type of documents to be ranked and to the type of instance assigning the links between the documents.

After having determined the citation statistics for the patent offices, all document links are weighted according to the calculated patent office statistics. For example, for a particular document citation/document link dl1 issued by patent office o1 in 2004, a document linkage weight $\alpha_{o1}$ is calculated as $$\alpha_{o1} = \frac{1}{\emptyset \text{ links per source document issued by } o1 \text{ in } 2004} = \frac{1}{3} = 0.33$$

For a particular document citation/document link dl2 issued by patent office o2 in 2004, a document linkage weight $\alpha_{o2}$ is calculated as $$\alpha_{o2} = \frac{1}{\emptyset \text{ links per source document issued by } o1 \text{ in } 2004} = \frac{1}{4} = 0.25$$

In the next step, 'document family links' are determined and weighted with a document family linkage weight β.

According to embodiments of the invention, at first, all document links are determined. Each document link connects a source document with a destination document. If at least one source document belonging to a first document family links to a destination document, the destination document belonging to another document family, a document family link is determined, whereby the first document family acts as source document family and whereby the other document family acts as destination document family of the determined document family link.

According to some embodiments of the invention, a document family link is undirected. According to other embodiments, a document family link is a directed link pointing from the source document family to the destination document family. According to some embodiments of the invention, an undirected connection between document family A and B can be modeled by a first document family link pointing from A to B and a second document family link pointing from B to A.

After having determined all document family links, a document family linkage weight β is calculated for each determined document family link. Each document family linkage weight β is calculated for a particular document family link based on the document linkage weights $\alpha_1, \ldots, \alpha_m$ of all document links $dl_1, \ldots, dl_m$ linking source documents of the source document family $DF_{Source}$ to destination documents of the destination document family $DF_{Dest}$.

The existence of a single document link connecting one single source document of the first document family with one single destination document of a second document family suffices to establish a document family link. In this case, the calculated document family linkage weight β solely depends on the document linkage weight α of said single document link.

According to a preferred embodiment, a document family linkage weight $\beta_{df1, df2}$ of a document family link connecting the source document family df1 with destination document family df2 is derived by calculating the maximum of all document linkage weights $\alpha_1 \ldots \alpha_m$ of all document links $dl_1 \ldots dl_m$ connecting documents of document family df1 with documents of document family df2:
$\beta_{df1, df2} = \text{MAXIMUM}(\alpha_{dl1}, \ldots \alpha_{dlm})$.

For example, in case a document family link is based on two document links dl1, dl2 connecting documents of a source document family df1 with documents of a destination family df2, and if $\alpha_{dl1}=0.25$ and $\alpha_{dl1}=0.33$, then $\beta_{df1, df2}=\text{MAXIMUM}(\alpha_{dl1}, \alpha_{dl2})=0.33$.

According to further embodiments, the document family linkage weight is calculated by using another arithmetic function such as the arithmetic mean, the median, the sum of the document linkage weights, the logarithm of the sum of the document linkage weights, the product of the document linkage weights, or any other function having been derived thereof.

For example, the document family linkage weight $\beta$ could be calculated as $\beta_{df1,\ df2}$=MEDIAN $(\alpha_{dl1}, \ldots \alpha_{dlm})$ or as SUM$(\alpha_{dl1}, \ldots \alpha_{dlm})$, or as ln$(N+$AGG$(\alpha_{dl1}, \ldots \alpha_{dlm}))$, wherein N is a number larger than 0 and AGG is an aggregating function such as a sum, a median, a mean and the like. According to preferred embodiments, N=1.

In the next step, an aggregate value $\gamma_{DFDest}$ of all document family linkage weights $\beta$ of all document family links pointing from one or multiple source document families $df_1 \ldots df_n$ to a destination document family $DF_{Dest}$ is determined. The aggregate value can be, for example, calculated as the sum of all document family linkage weights of the document family links pointing to the destination document family $DF_{Dest}$:

$$\gamma_{DFDest.}=\Sigma_n(\beta_{df1}, \ldots \beta_{dfn}).$$

The aggregate value $\gamma$ is indicative of the linkage relevance of the document family $DF_{Dest}$: the higher the number of documents citing documents of document family $DF_{Dest}$, and the higher the number of document family links connecting various source document families to $DF_{Dest}$, The higher the aggregate value $\gamma$.

According to further embodiments of the invention, the aggregate value $\gamma$ may likewise be calculated based on another arithmetic function such as the arithmetic mean, the median, the product, a maximum function or any derivative thereof. Said other arithmetic function also operates on all document family linkage weights of all document family links pointing to the destination document family $DF_{Dest}$.

According to further embodiments, an additional weighting step is executed in order to weight document links from different fields in dependence on the relevance of the field for the interests of a particular user. Each field $f_1, \ldots, f_v$ is assigned a user-defined relevance value. Said user-defined relevance value is indicative of the relevance of a field for the user. According to embodiments, the fields of the one or more documents of a document family can also be assigned to the document family itself. This is, for example, the case with technology fields. Accordingly, each document family is assigned one or more technology fields of its documents.

In a next step, each value $\beta_{dfn}$ is weighted with the user-defined relevance value assigned to the field f to which the source document family has been assigned to. If the source document family has been assigned to multiple fields, then the values $\beta_{dfn}$ are weighted with e.g. the average, the median, the maximum or the minimum of the individual field-specific user-defined relevance weights. The weighting step can be accomplished, for example, by multiplying $\beta_{dfn}$ with a user-defined relevance score for said field f. As a result, scores $\gamma_{DFDest}$ are returned as results, said results being normalized according to the significance of different fields for the user. In case each document family is assigned to only one technology field, the function used could be:

$$\gamma_{DFDest.} = \sum_n (\varepsilon_{f1\ df1} \cdot \beta_{df1}, \ldots \varepsilon_{fn\ dfn} \cdot \beta_{dfn})$$

The value $\varepsilon_{fn\ dfn}$ is the relevance of the field fn assigned to document family dfn for the interests of a particular user.

The aggregate value $\gamma$ having been calculated for each destination document family $DF_{Dest}$ is returned as DFLS value of said document family $DF_{Dest}$.

Normalization

According to further embodiments of the invention, the aggregate value $\gamma$ of each destination document family can further be refined and its accuracy further be increased by normalizing said value in respect to e.g. a time period or field dependent reference value.

Calculating a Time Period Dependent Citation Statistic

According to some embodiments of the invention, the normalization step is performed by calculating, for each time period z of a set of time periods $z_1, \ldots z_k$, an intermediate value $X1_{z=1}=\emptyset(\gamma_{DFDest\_1.:\ z=1}, \ldots, \gamma_{DFDest\_I.:\ z=1}), \ldots,$ $X1_{z=k}=\emptyset(\gamma_{DFDest\_1.:z=k}, \ldots, \gamma_{DFDest\_I.:\ z=k})$. The intermediate value $X1_{z=y}$, for example, is an average of the aggregate value $\gamma$ of all document families whose status depends on a date lying within the time period z=y, y being the time period for which X1 is calculated.

Said date can be, for example, the publication date of the earliest published document belonging to the document family $DF_{Dest}$. According to further embodiments of the invention, said data can also be the priority date of a document family, whereby the document family represent a patent family. According to further embodiments, said date is the filing date of the earliest filed patent document belonging to a document family, or is the earliest date of receiving patent protection for any of the patent documents belonging to the document/patent family.

According to some of said embodiments, the documents represent patent documents and the document families represent patent families. Accordingly, the time period z can be the year of first publication/the priority year/the earliest year of tanning patent protection or the like. Depending on the embodiment, said year can be a calendar year or can be a time period of e.g. 12 months backwards starting from sheet date. The "sheet date" is the date at which the method according to embodiments of the invention is executed or for which the relevance scores are calculated retrospectively.

According to further embodiments, shorter or longer periods of time than said 12 month may be used instead. If the method is executed on May 1, 2010, the last k 'years' $z_1$-$z_k$ would comprise the following time spans:

$z_1$: May 1, 2009 to May 1, 2010
$z_2$: May 1, 2008 to May 1, 2008
$z_3$: May 1, 2007 to May 1, 2007 ...
$Z_k$: May $1^{st}$ (2010-k) to May $1^{st}$ (2010-k+1)

The number k indicates the most distant year in the past still considered for the calculation. For patent documents, k may range from 20 to 100 years depending on the particular purpose of executing a relevance calculation. As patens usually expire after 20 years, the consideration of years lying farther back in the past may be of use to evaluate historic developments of a patent portfolio along a greater time span.

For example, for z=2004, the average $\emptyset_{z=2004}$ $(\gamma_{DFDest\_1.:z=2004}, \ldots, \gamma_{DFDest\_I.:z=2004})$ of all patent families $DF_{Dest\_1}, \ldots, DF_{Dest\_I}$ having e.g. their year of first publication z=2004, is determined, and an intermediate result $X1_{z=2004}$ is calculated:

$$X1_{z=2004} = \emptyset(\gamma_{DFDest\_1,z=2004}, \ldots, \gamma_{DFDest\_1,z=2004})$$

The intermediate value X1 is indicative of the average aggregate value $\gamma$ per time period.

In order to allow the normalization of document family linkage scores, according to preferred embodiments of the invention, the average aggregate value $\gamma$ is calculated for each time period $z_1$-$z_k$ by calculating, for each time period, the average aggregate value and for all patent families $DF_{Dest.z=x}$ having their date of first publication/priority date/ first filing date within said time period. Accordingly, for all time periods $z_1, \ldots, z_k$, an intermediate value $X1_{z=1}, \ldots, X1_{z=k}$ is calculated, thereby creating a time period dependent citation statistics.

Calculating a Normalized Value δ for Each Patent Family $DF_{Dest}$.

After having calculated for the set of time periods a time dependent calculation statistic, said statistic is used to normalize the aggregated value γ of each document family in relation to all document families having the same period of first publication z (or, for other embodiments: having the same priority period or the same period of first filing).

According to a preferred embodiment of the invention, for each document family $DF_{Dest.}$ a normalized aggregated value $\delta_{DFDest.}$ is calculated. In case the period of first publication z of document family $DF_{Dest.}$ is k, $\delta_{DFDest.}$ is calculated as follows:

$$\delta_{DFDest.} = \frac{\gamma_{DFDest.}}{X1_{z=k}}$$

The intermediate value X1 is based on all document families having the same period of first publication as the document family $DF_{Dest}$. According to said embodiments, the calculated normalized aggregate value $\delta DF_{Dest.}$ of the document family $DF_{Dest.}$ is calculated and returned as DFLS value.

Calculating a Linkage Statistics Per Field:

A 'field' is a property of a document family, e.g. a technology field of said document. According to further embodiments, a normalization step based on the field f of a document family $D_{FDest.}$ is executed. Said normalization step can be executed in addition to the time period based normalization step. According to further embodiments, the field based normalization may be executed without executing the time period specific normalization by weighting the aggregate value γ by a weight factor being particular for the fields assigned to document family $DF_{Dest}$.

a) In a first step, one or multiple fields $f_1, \ldots, f_v$ having been assigned to the one or more document families are determined.

According to some embodiments of the invention, the documents are patent documents, the fields are technology fields and each document is assigned one or more IPC sub-class identifiers, each IPC sub-class identifier representing a technology field. Each technology field assigned to a document of a document family is considered as technology field of the document family. A patent family may have been assigned to one or multiple IPC sub-classes. To give one example, the technology field f being based on the four digit IPC code 'C07F' relates to chemical substances comprising elements of the second group of the periodic table of elements.

b) In a further step, an intermediate value X2TFf,z is calculated for each of the fields f1, . . . , fv and for each of the time periods z1, . . . zk.

Z indicates a time period comprising a date such as the date of first publication, a priority date, the date of first filing a patent document or the date of earliest granting of a patent for a patent document. The expressions "earliest" and "first" relates to other documents belonging to the same document family as said document.

The intermediate $X2TF_{f,z}$ value is calculated as the average of all normalized aggregate values $\delta_{DFDest.,f,z}$ of all document families $DF_{Dest-f,z}$ having been assigned to field f and having a status depending on the date lying within the same time period z;

For example, for z=12 (e.g. the year of first publication=12) and f='C07F', the average $\emptyset_{z=12,f=C07F}$ ($\delta_{b:z=12,f=C07F}$) of all patent families having their year of first publication z=12 and having been assigned to technology field f='C07F' is determined. For example, if 2233 document families are known to have assigned the year of first publication z=12 and the technology field f=C07F, the intermediate result $X2TF_{DFDest.:z=12,f=C07F}$ representing the average δ of all patent families having a year of first publication z=12 and having been assigned to technology field f=C07F and is calculated as:

$$X2TF_{DFDest:\ z=12,f=C07F.} = \emptyset_{z=12,f=C07F}(\delta 1_{b:\ z=12,f=C07F}, \ldots, \delta 2233_{b:\ z=12,f=C07F})$$

The symbol ø represents a mathematical function for calculating the arithmetic mean.

According to a preferred embodiment, X2TF is determined based on a time period of two or three years or longer in case a set of document families of a particular year of first publication and of a particular technology field comprises less documents than a particular threshold value, e.g. less than 200 items.

c) In a further step, an intermediate value X2 is calculated for each document family $DF_{Dest}$.

The intermediate value X2 is calculated as the average ø of all intermediate values $X2TF_{f1,z}, \ldots, X2TF_{fm,z}$:

$$X2_{DFDest.} = \emptyset(X2TF_{f1,z}, \ldots, X2TF_{fm,z})$$

Hereby, the intermediate values $X2TF_{f1,z}, \ldots, X2TF_{fm,z}$ are intermediate values having been calculated for each field $f_1, \ldots, f_m$, wherein each field $f_1, \ldots, f_m$ has been assigned to the document family $DF_{Dest}$.

The field series $f_1 \ldots, f_v$ encompasses the totality of the specified fields or the totality of fields assigned to any of the one or more document families. The field series $f_1, \ldots, f_m$ encompasses the totality of fields having been assigned to a particular document family.

According to further embodiments, the value $X2_{DFDest.}$ is calculated by using another arithmetic function than the arithmetic mean, such as for example the median, the minimum, the maximum, or any other function having been derived thereof.

d) In a further step, for each document family DFDest, the final DFLS value is calculated:

The DFLS value for a particular document family $DF_{Dest.}$ is calculated as the ratio of $\delta_{DFDest.}$ to the intermediate value X2:

$$DFLS_{DFDest.} = \frac{\delta_{DFDest.}}{X2}$$

According to a further embodiment of the invention, the DFLS value may be further refined to rise the accuracy of the DFLS by executing a DFLS correction step on all document families having a date of first publication lying fewer than a maximum time threshold, e.g. 24 months, before the sheet date. According to one embodiment, the DFLS value for those "particularly young" patent families is replaced by a predefined or calculated score value. Said calculated score value could be, for example, the average DFLS value having been calculated for patent families of the same document owner, e.g. a company holding multiple patent documents, said patent documents having a date of first publication during a time period lying more than said time threshold in the past. By applying said correction, the relevance of younger documents can be estimated more precisely. The "year of first publication" as used herein is the year when the first document belonging to a document family was published.

In other embodiments, said calculated score used for "particularly young" patent families are derived from other properties of the document family or are from derived scores such as for example the DFCS.

According to other embodiments, instead of the "year of first publication", other document related data types can be used such as, for example, the priority date of the patent family, the filing date of the earliest filed patent document of a patent family, or the earliest date of receiving patent protection for any of the patent documents belonging to the document family.

According to further embodiments, a modified method for calculating the DFLS score of a destination document family is provided.

According to embodiments making use of a first modified method for calculating the DFLS score value, an $X2B_{DFDest}$ value is calculated instead of the $X2B_{DFDest}$ value. According to said embodiments, $\gamma_{DFDest}$ values are used instead of $\delta_{DFDest}$ values for calculating the DFLS value. According to said embodiments, the DFLS value is calculated by the following steps:

- determining one or multiple fields $f_1, \ldots, f_v$ having been assigned to the one or more document families,
- calculating, for each field $f_1, \ldots, f_v$ and for each time period $z_1, \ldots z_k$ an intermediate $X2BTF_{f,z}$ value, the intermediate $X2BTF_{f,z}$ value being calculated as the average of all aggregate values $\gamma_{DFDest,f,z}$ of all document families $DF_{Dest,f,z}$ having been assigned to field f and whose status depends on the same kind of date, the date lying within the time period z;
- calculating, for each destination document family $DF_{Dest}$, an intermediate value $X2B_{DFDest}$, wherein $X2B_{DFDest}=\phi(X2BTF_{f_1,z}, \ldots, X2BTF_{f_m,z})$, whereby the intermediate values $X2BTF_{f_1,z}, \ldots, X2BTF_{f_m,z}$ are intermediate values having been calculated for each field $f_1, \ldots, f_m$, the fields $f_1, \ldots, f_m$ each having been assigned to the document family $DF_{Dest}$,
- calculating the DFLS value for each document family $DF_{Dest}$ by dividing $\gamma_{DFDest}$ by $X2B_{DFDest}$.

According to preferred embodiments, the 'field' is the technology field a document family belongs to. The expression 'the same kind of date' encompasses that the same type of event happened in time period z, said type of event being, for example, the date of first publication, the filing date, the priority date of a document and the like.

According to embodiments making use of a second modified method for calculating the DFLS score value, an additional weighting step is executed in order to weigh different fields in dependence on the relevance of the field for the interests of a particular user. Each field $f_1, \ldots, f_v$ is assigned a user-defined relevance value. Said user-defined relevance value is indicative of the relevance of a field for the user. In a next step, each intermediate value $X2TF_{f_1,z}, \ldots, X2TF_{f_v,z}$ is weighted with the user-defined relevance value assigned to the respective field f. The weighting step can be accomplished, for example, by multiplying $X2TF_{f,z}$ of the technical field f with a user-defined relevance score for said field f. As a result, intermediate values $X3TF_{f_1,z}, \ldots, X3TF_{f_v,z}$ are returned as results, said results being normalized according to the significance of different fields for the user. Finally, the returned $X3TF_{f_1,z}, \ldots, X3TF_{f_v,z}$ values are used instead of the intermediate $X2TF_{f_1,z}, \ldots, X2TF_{f_v,z}$ values for calculating the X2 and DFLS values. The calculation of an X3TF score is an alternative to weighting the document family linkage scores β with a user-defined relevance value ε assigned to each field as described beforehand. The calculation of an X3TF score is an alternative approach allowing taking into consideration the relevance of different fields for the interests of a user when calculating the DFLS value for a document family.

4. Calculating for Each Document Family the DFCR Value:

the document family combined relevance score $DFCR_{DFDest}$ is calculated for each document family by multiplying the document family coverage score by the document family linkage score of document family $DF_{Dest}$:

$$DFCR_{DFDest}=DFCS_{DFDest} \times DFLS_{DFDest}$$

Embodiments of the invention wherein property-specific weights, e.g. weights being indicative of the significance of the country wherein a document is valid, used for calculating the DFCS value are normalized against an external data value such as the gross national product are particularly advantageous in combination with applying a multiplication of the DFCS value with the DFLS value for calculating the DFCR value. Normalizing the country specific weights $w_c$ against an external reference value is advantageous, as the calculated scores can be comprehended more easily: by calculating a normalized DFCS value, the DFCS value of a document family can be expressed in relation to an external reference value such as, for example, the gross national product of a country, and the numerical value of the DFCS score can be decreased.

It has been observed that a multiplication of the two independently derived score values DFCS and DFLS is particularly advantageous and allows to increase the accuracy of calculating the relevance of a document of a document family compared to methods which summarize different relevance scores.

5. Grouping Document Families into One or More Portfolios, Each Portfolio Comprising One or More Document Families;

Depending on the embodiment of the invention, the grouping may be based on predefined property values of the document data objects belonging to a document family or be based on the dynamic grouping of documents families executed by a clustering or machine-learning based algorithm.

According to embodiments of the invention, document families sharing one or more property values or value ranges are grouped into the same portfolio. Said property may be, for example,

- the field of a document family,
- the business field of a document family,
- the company of a document family,
- the document type of the document family,
- the document kind code of a document family,
- the organizational subunit of a company owning a document family,
- the branch of a company owning a document family,
- the geographic region wherein a document family is valid or where it originates from,
- the status of a of a document family,
- an IPC-class or sub-class,
- a patent office, a publisher or journal the topic of the text of the document, a time period, a patent examiner, a bibliographic feature such as the name of an author or an inventor, or a feature having been determined by a clustering algorithm applied on the documents.

A person skilled in the art is able to adapt the set of properties or criteria used to specify a portfolio as required by a particular document type and usage scenario. A portfolio, according to preferred embodiments of the invention, resembles any set of document families based on which a user may be interested to derive an aggregate value from it. For example, according to a preferred embodiment, document families are assigned to the same portfolio if they share the same document family owner, e.g. a company holding patent documents. According to other embodiments, portfolios may be defined by groups of document families comprising documents which are, have been or will potentially be valid within a particular geographic territory or which are valid at a particular sheet date.

According to a preferred embodiment of the invention, the user is provided with means to specify one or multiple properties according to which the portfolios shall be defined. By providing a method for specifying multiple properties based on which portfolios can be built and an aggregating score value can be derived, the method provides means for deriving multi-dimensional score values aggregated based on a multitude of categories which may be of interest for a user, e.g. the company owning a document family or a department of the company having created the invention a patent document family is based on.

6. Displaying, for Each Document Portfolio, an Aggregated View.

At least one aggregated score value is derived by an aggregating function applied on one or more document family scores of all document families of the document portfolio. An aggregated score value is indicative of the aggregated relevance of the documents within a set of document families, e.g. a portfolio. The document family scores used for calculating an aggregate score function comprise the document family combined relevance score DFCR, the document family linkage score DFLS and the document family coverage score DFCS. The aggregated view displayed to the user e.g. in the form of a printout or a screen comprises and/or is derived from one or more aggregated score values.

According to a further embodiment of the invention, the user is provided with means to specify which kind of aggregate score values shall be calculated and displayed. The aggregated score value of a portfolio may be displayed e.g. in the form of a printout or on an electronic display such as a screen. The aggregating function applied on said patent family score values may be, for example, a counting, summarization or multiplication of score values or any derivative function thereof.

According to a preferred embodiment of the invention, the following aggregate score values are calculated:

the portfolio size PSI, wherein the portfolio size of each portfolio is calculated as the number of document families within the portfolio having a DFCS value larger than 0;

the portfolio strength PST, wherein the portfolio strength of each portfolio is calculated as the sum of the DFCR score values of all document families within the portfolio. In case the documents are patent documents, each patent family represents one invention and the patent portfolio strength is the sum of the DFCR score values of the inventions contained in the portfolio.

the portfolio linkage score PLS, wherein the portfolio linkage score is calculated for each portfolio as the average of the DFLS values of all document families within the portfolio having a document family coverage score value larger than 0;

the portfolio coverage score PCS, wherein the portfolio coverage is calculated for each portfolio as the average of the document family coverage scores of all document families within the portfolio having a document family coverage score value larger than 0;

the field share FSH. Ratio of the sum of the DFCR score values of all document families of a portfolio and the sum of the DFCR score values of a superset of document families, wherein the document families of the portfolio and the document families of the superset have assigned the same field for which the FSH is calculated, e.g. if said document families have assigned a particular technology field. The superset of document families can be, for example, the totality of document families examined.

According to embodiments, the FSH value is calculated for a particular portfolio and a particular field by:

calculating a first sum as the sum of all DFCR values of all document families having assigned said field and belonging to said portfolio calculating a second sum as the sum of all DFCR values of all document families having assigned said field and belonging to a superset of document families, said superset of document families comprising said portfolio, and calculating the ratio of the first and the second sum and using said ratio as field share value FSH.

According to some embodiments, the field share is calculated as the sum of the DFCR scores of all the patent families assigned to a particular field f, e.g. a technology field, and a particular portfolio, divided by the sum of the DFCR scores of all patent families examined and having been assigned to said field f.

According to some of said embodiments, said portfolio may be the totality or a subset of all patent documents owned by a company. To calculate the FSH for a particular technological field and a particular portfolio of a company by said embodiment of the invention, it is required that each document family is assigned an identifier of the company owning the document family. The field share according to said embodiments measures what share of the proprietary technology a company is engaged in is owned by said particular company.

According to a preferred embodiment of the invention, the data structures specifying a portfolio of document families provide the ability to execute a multidimensional drill-down analysis of the aggregate relevance scores of all or a subset of document families of a portfolio. A multi-dimensional drill-down analysis of the aggregate score in this context means that each portfolio and the document families contained therein may be further divided into several second order sub-sets of document families. Each sub-set comprises document families sharing a particular property, e.g. a particular year of first publication, a particular author, document owner, document type and so on. The patent portfolios are first-order sets of document families. Each portfolio may be further divided into second-, third-, fourth- or fifth order sub-sets. The division into sub-sets of document families is executed iteratively until a predefined or user-defined level of analysis granularity is reached. The aim of the multi-dimensional drill-down analysis is to provide the user with a fine-grained comparison and visual representation of the relevance of documents having been assigned to particular category of a particular hierarchical level.

According to a further embodiment of the invention, the user is provided via a graphical user interface with means to select, during the drill-down analysis, a document-family sub-set of an arbitrary level of the hierarchy of document family sub-sets. As a result of said selection, the documents or document families of the selected sub-set of document families is displayed to the user, wherein the displayed documents or document families are ranked according to any of the DFCR, the DFLS or the DFCS values or derivatives thereof.

According to a further embodiment of the invention, the multi-dimensional drill-down analysis is executed to determine the aggregate score value 'field share'. Thereby, the documents represent patents, the document families are patent families and a DFCR score is calculated for every document family $DF_{Dest.}$ as described previously. FIG. 8 shows the aggregated field share of four companies. In case all document families available are used in this analysis, the drill-down analysis would comprise two dimensions: one dimension represents the company for which the field share is calculated, the second dimension represents the aggregate score value of all document families of a particular company, in this case the aggregate PFCI score values of all patent families of a company. The analysis may further drill-down into a third dimension by further grouping the field share values of a particular company according to the year of first publication of each document family considered (see the bars of the field share in FIG. 8 for the years 1998-2003 wherein one bar represents a particular sheet date). According to further embodiments, a fourth dimension of drill-down analysis may be applied, e.g. by further dividing the field share of each particular company reached in each particular year according to the various R&D departments run by each company.

The type of criteria chosen for the drill-down analysis of data as well as the type of aggregated relevance score (PSI, PST, FSH, PLS, PCS) calculated on each portfolio, sub-set and sub-sub set of document families depends on the particular use case (the document type, the properties assigned to each document, the topic a user executing the drill-down analysis considers as 'relevant' and the degree of analysis granularity the user considers appropriate).

According to a preferred embodiment of the invention, the drill-down analysis of document families is implemented based on OLAP cubes. An OLAP (Online analytical processing) cube is a data structure arranging data into cubes. The cube structure provides the possibility to execute a drill-down analysis of the data contained in the cube. Drilling down a data space is an analytical technique whereby the user navigates among levels of data ranging from the most summarized (up) to the most detailed (down). By representing the set of document families assigned to a particular portfolio in the form of an OLAP cube, an aggregate score value can be derived on multiple levels of document family subsets. The aggregate score may be calculated based on one or multiple aggregate functions executed on the DFCS, DFLS or DFCR value(s) of all document families assigned to a particular portfolio or document family sub-set on any level of the drill-down hierarchy. The term 'portfolio-coverage' or 'portfolio-size' does not imply that said aggregate function is applied solely on the document families within a particular portfolio, the first-order set of document families. Rather, it can be applied to any sub-set of document families within said portfolio in case a drill-down analysis of data is requested by the user.

According to a preferred embodiment of the invention, the portfolios as well as their sub-sets of document families are defined based on particular properties of the document families.

According to further embodiments of the invention, the portfolios or any of the sub-sets of document families of the portfolios are determined by executing a clustering or a classification algorithm on the document families. A classification algorithm is an algorithm according to which document families are assigned to predefined categories, e.g. to a list of companies or countries of interest. A clustering algorithm is an algorithm being able to group together document families being strongly related to each other while separating document families being significantly different from each other in respect to one or several properties of interest wherein the final groups, also called 'clusters', do not necessarily have to be specified in advance. Various clustering and classification methods are known to a person skilled in the art and have to be chosen depending on the type of documents and on the interests of the user. The applied clustering or classification method may result in overlapping or non-overlapping groups of document families. A method allowing different document family clusters or classes to overlap may be appropriate to separate document families according to features which are not mutually exclusive: a patent family may be assigned to multiple different technology fields, but it cannot have multiple different years of first publication. In order to group document families into clusters or classes according to the latter kind of property, non-overlapping clustering or classification approaches may be more appropriate.

According to a further embodiment of the invention, the aggregated score value(s) calculated by any of the described aggregate score functions of various portfolios or subclasses are displayed graphically in the form of a graphical element displayed e.g. on a computer screen or a printout. Alternatively, said calculated score values are not displayed directly but are used to specify graphical elements being indicative of a particular score value or score value range. Said graphical element can be a chart, e.g. a barchart, line-chart, pie-chart, block-chart, a 2D or 3D chart or the like. The graphical element may also be a symbol, a geographic, organizational or other map.

According to embodiments, said graphical elements are characterized by one or more layout properties, said layout properties being indicative of the aggregated score value or value range. Depending on the embodiment, the layout property can be a color, a shape, a hatching, or the like. For example, a set of colors (a color schema) can be used to encode an aggregated score value range.

According to embodiments of the invention, the aggregated view comprises the numeric value of the aggregated score value or one or more graphical elements, said graphical elements being characterized by one or more layout properties, said layout properties being indicative of the aggregated score value or value range.

According to embodiments of the invention, the aggregated view comprises a chart, the chart being indicative of one or more aggregated score values.

According to a further embodiment of the invention, the graphical element, e.g. a symbol or a chart, is displayed on top of a geographic map in case the aggregate score value represented by the graphical element has been calculated for a particular geographic region. By placing the graphical element on top of the geographic region the aggregate score value has been calculated for, the user gets a quick and intuitive impression of the aggregated score value of all document families having been assigned to said geographic region.

According to embodiments, the aggregated score is indicative of the economic relevance of all patent documents valid within a particular geographic region.

According to a further embodiment of the invention, the aggregate score values and/or graphical elements like symbols, charts, color-coded map-regions or other color-encoded elements representing such score values are presented to remote users via a network, e.g. by displaying said graphical elements on a web-page being accessible via the Internet or intranet of a company.

All said display options based on graphical elements or numbers being indicative of an aggregate relevance score such as a FSH, PST, PSI, PCS or the like are subsumed as the provision of an "aggregated view".

According to a further embodiment, the position of a document family or for a symbol or figure representing an aggregate score value of a set of document families is determined by the following steps:
  Determine the addresses of the person or company owning a document, e.g. a patent document,
  determine, e.g. by calling an external web service, geo-coordinates of the addresses derived in the first step,
  Display the aggregated score value or a symbol representing this value on a geographic map.

According to a further embodiment, the weighted document family links determined during the calculation of the DFLS can be used to determine the net information flow between geographic regions in a time dependent manner. As document families can be assigned to countries directly or can be assigned to persons or companies owning the documents which can be mapped to geo-coordinates via their addresses, it is possible to determine if e.g. in a particular year 1999 as many document family links pointed from India to the USA as in the opposite direction, and if the sum of all document family linkage weights from one country to the other differ. In case the number and weight of document family links pointing from India to the USA exceeded for several years those pointing from the USA to India, this indicates an information flow from the USA to India in said period. This information is an additional beneficial aspect of the method for quantifying the relevance of documents.

In a further aspect, the invention relates to a corresponding computer system comprising said storage medium, a processor for executing the instructions on said storage medium and comprising graphical output means for displaying the aggregated view provided by said method.

In a further aspect, the present invention relates to a computer implemented method for quantifying and ranking the relevance of documents, the documents being represented by document data objects, the method comprising:
  assigning documents to one or multiple document families, each document family comprising one or multiple documents;
  calculating, for each document family, a document family coverage score DFCS, the document family coverage score being indicative of the validity of the document family in a category, whereby the validity is calculated from one or more properties of each document belonging to said document family;
  calculating, for each document family, a document family linkage score DFLS, said document family linkage score being calculated by
    finding one or more document links, each document link connecting a source document to a destination document, each destination document belonging to said document family, each source document belonging to another document family,
    finding one or more document family links, whereby each document family link connects a source document family with said document family, said document family acting as destination document family, wherein the existence of each document family link is derived from the one or more found document links and wherein the DFLS is derived from the existence and weight of the one or more found document family links;
  calculating, for each document family, a document family combined relevance score DFCR by multiplying the document family coverage score DFCS and the document family linkage score DFLS having been calculated for each document family;
  ranking all documents or document families according to the calculated DFCS value, the DFLS value, the DFCR value, or any derivative thereof.

Different embodiments of said method exist according to which the DFCS, DFCR and DFLS values are calculated as described for different embodiments of the method for quantifying and aggregating the relevance of documents.

In a further aspect, the invention relates to a computer implemented method for calculating a document family linkage score value for document families, the document families being represented by data objects, the method comprising the steps:
  assigning documents to one or multiple document families, each document family comprising one or multiple documents;
  finding one or more document links, each document link connecting a source document to a destination document,
  determining, for each document link connecting source document d1 with destination document d2, a document linkage weight $\alpha_{d1,d2}$;
  determining all document family links, whereby each document family link connects a source document family with a destination document family, wherein the existence and weight of each document family link is derived from one or more document links connecting source documents of the source document family to destination documents belonging to the destination document family;
  determining for each document family link, a document family linkage weight $\beta$, the document family linkage weight $\beta$ being derived from the weights of the document links linking documents of the source document family $DF_{Source}$ to documents of the destination document family $DF_{Dest}$,
  calculating for each destination document family $DF_{Dest.}$ an aggregate value $\gamma$ as a derivative of the linkage weights $\beta_{DFSource\_j, DFDest.}$ of all document family links pointing from one or multiple source document families to destination document family $DF_{Dest.}$,
  returning the calculated aggregate value $\gamma$ as document linkage score value of the destination document family.

Different embodiments of said method exist according to which the document family linkage score value is calculated as described for different embodiments of the method for quantifying and aggregating the relevance of documents.

Embodiments of the invention solely making use of a linkage-based score value are advantages in case the calculation of a document family coverage score is computationally expensive. In addition, solely linkage-based scores allow the comparison of document families of different types, including also those for which no document family coverage score can be calculated.

In a further aspect, the present invention relates to a computer readable storage medium comprising instructions which, when executed by a processor, cause the processor to execute a method for quantifying and aggregating the relevance of documents according to any of the methods described above.

In a further aspect, the present invention relates to a computer readable storage medium comprising instructions which, when executed by a processor, cause the processor to execute a method for quantifying and ranking the relevance of documents according to any of the methods described above.

According to further embodiments of the invention, the computer readable storage medium comprises instructions which, when executed by the processor, cause the processor to calculate a document family linkage score DFLS according to any of the methods described above.

In a further aspect, the invention relates to a computer system comprising a processor and a computer readable storage medium comprising instructions for executing the method for quantifying and aggregating the relevance of documents, the method for quantifying and ranking the relevance of documents or the method for calculating the DFLS value of document families according to any of the above embodiments. Said computer system further comprises a graphical output means such as an electronic display, a printer, or a network connection to a remote display means.

BRIEF DESCRIPTION OF THE DRAWINGS

In the following, embodiments of the invention are described by way of example, only making reference to the drawings in which:

FIG. 10 is a table displayed to a user, the table comprising multiple aggregate score values of the patent portfolios of four companies.

FIG. 1 provides an overview on the method for quantifying the relevance of documents. The method for quantifying the relevance of documents is also referred to as 'Portfolio Benchmarking'. In case the documents are patents, the method according to embodiments of the invention provides an improved method for quantifying the significance, e.g. the economic relevance, of patent documents.

Figure 1:
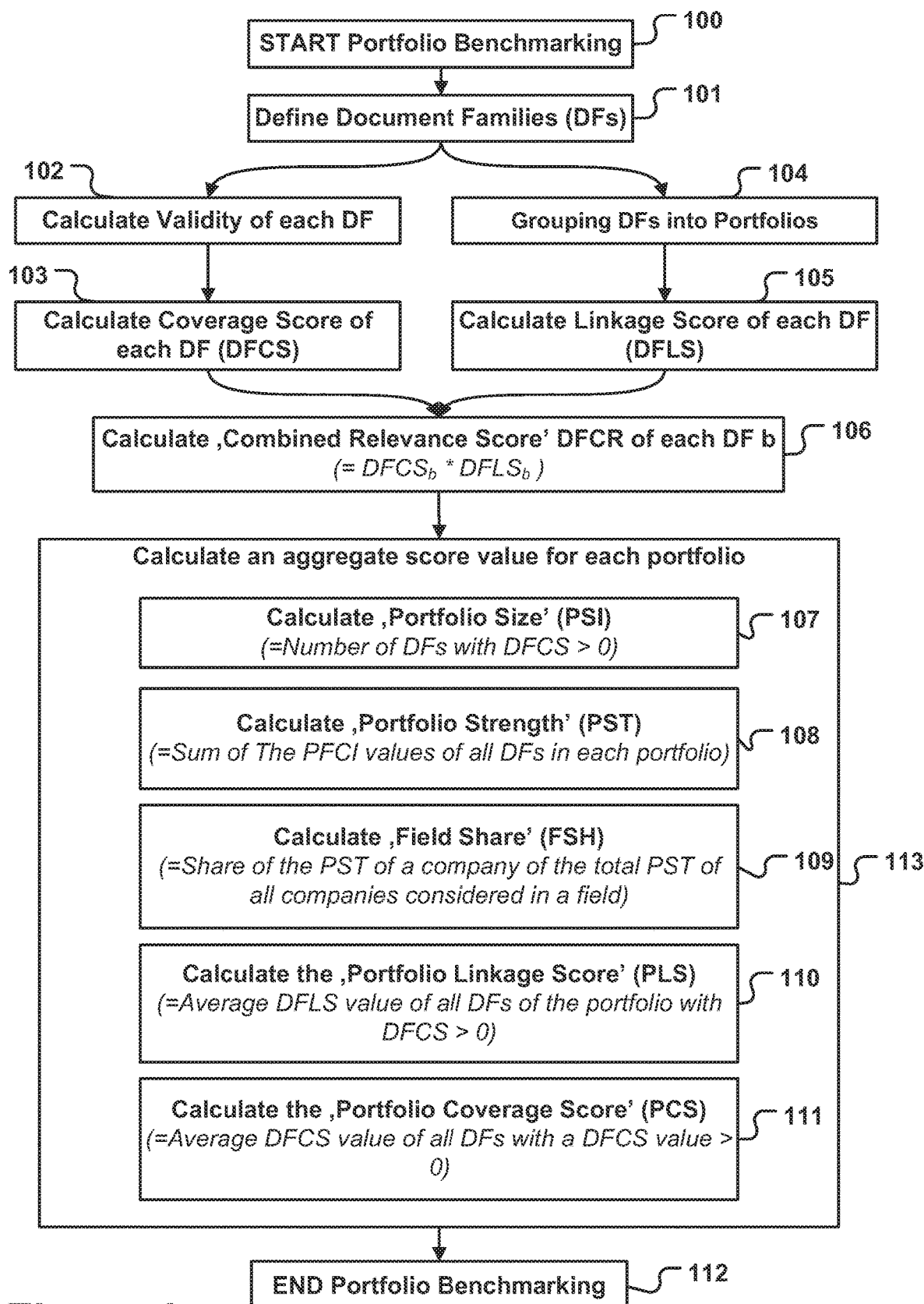
FIG. 1 is a flowchart providing an overview on the method for quantifying the relevance of documents, also referred to as 'Portfolio Benchmarking'.

After the portfolio benchmarking method has been started in step 100, document families are defined in step 101 by assigning multiple documents to document families having one or multiple properties in common, e.g. referring to the same invention. On the data object level, this step implies connecting document data objects of the same document family to each other e.g. by adapting the values of document data object attributes or by creating entries in association tables of data bases. The criterion according to which documents are assigned to document families depends on the type of documents. In case the documents are patent documents, the patent documents referring to the same third patent document as priority document or referring to each other as priority documents are grouped into one document family, here called patent family. All patent documents of a patent family represent the same invention. In step 104, document families whose documents share are particular property are grouped into portfolios; For example, if all documents are patent documents and all document families are patent families, document families may be grouped to portfolios if they share the same owner, here referred to as patent holder, usually a company. The owner may be a person or a company or any other institution and is, according to a preferred embodiment, derived from properties of the document data objects assigned to the document family. In case the documents are patents, each document may comprise information on the applicant, usually a company, holding the patent. In step 102, the validity of each document is examined. This step comprises testing whether the meta-information of the document data object comprises sufficient and consistent data, e.g. on the legal status of a document in a country or other pieces of data which may be of relevance in succeeding processing steps. According to a preferred embodiment of the invention, patent documents being not patent documents and patent applications in the strict meaning of the word, e.g. utility patents and utility patent applications, are filtered out in this step. In addition, patent documents issued from patent offices providing only insufficient data on the legal status may be filtered out here.

In step 103, the DFCS value is calculated for each document family (DF) which will be explained in greater detail by FIG. 3. In step 105, the DFLS value is calculated for each document family DF which will be explained in greater detail by FIGS. 4*a*-4*c*. In step 106, for each document family b the DFCR score value is calculated as the product of the DFCSp and the DFLS, value of said family.

In step 113, one or multiple aggregate relevance scores, e.g. the portfolio size PSI, the portfolio strength PST, the field share FSH, the portfolio linkage score PLS or the portfolio coverage score PCS, are calculated on the DFCS, DFLS and DFCR score values of all document families within a portfolio. A portfolio may comprise the totality of document families available and managing to pass the validity check in step 102 or any document family sub-set thereof. According to preferred embodiments of the invention, each portfolio comprises all document families being owned by the same person or company.

According to embodiments of the invention, one or multiple of the following aggregate score values are calculated:

The portfolio size PSI is calculated in step 107 and represents the total number of document families of a portfolio having a DFCS value greater than 0.

The portfolio strength PST is calculated in step 108 as the sum of the DFCR values of all document families of a portfolio.

The field share FSH is calculated in step 109 as the ratio of the sum of the DFCR score values of all document families of a portfolio and the sum of the DFCR score values of a superset of document families, whereby only document families having assigned a particular field of interest are considered According to said embodiment, the field share FSH measures what share of the proprietary technology of the industry is owned by a certain company. It can be calculated as the share of the Patent Portfolio Strength of a company in the total Patent Portfolio Strength of all companies in the industry. Depending on the embodiment, the FSH value can also be calculated as the share of the Patent Portfolio Strength of a company in a particular technology field in relation to the total Patent Portfolio Strength of all patent families in that technology field. It can also be calculated as a share of a PST value of an arbitrary sub-portfolio derived by grouping patent families according to e.g. some criteria A and B compared to a total PST value of a portfolio derived by grouping patent families according to e.g. criteria A.

The portfolio linkage score PLS is calculated in step 110 as the average of the DFLS value of all document families of the portfolio with a DFCS value greater than 0. The portfolio linkage score is indicative of the relevance of a portfolio.

The portfolio coverage score PCS is calculated in step 111 as the average of all DFCS values of all document families of the portfolio with a DFCS value greater than 0.

Finally, the end of the benchmarking method is reached in step 112.

Figure 2:
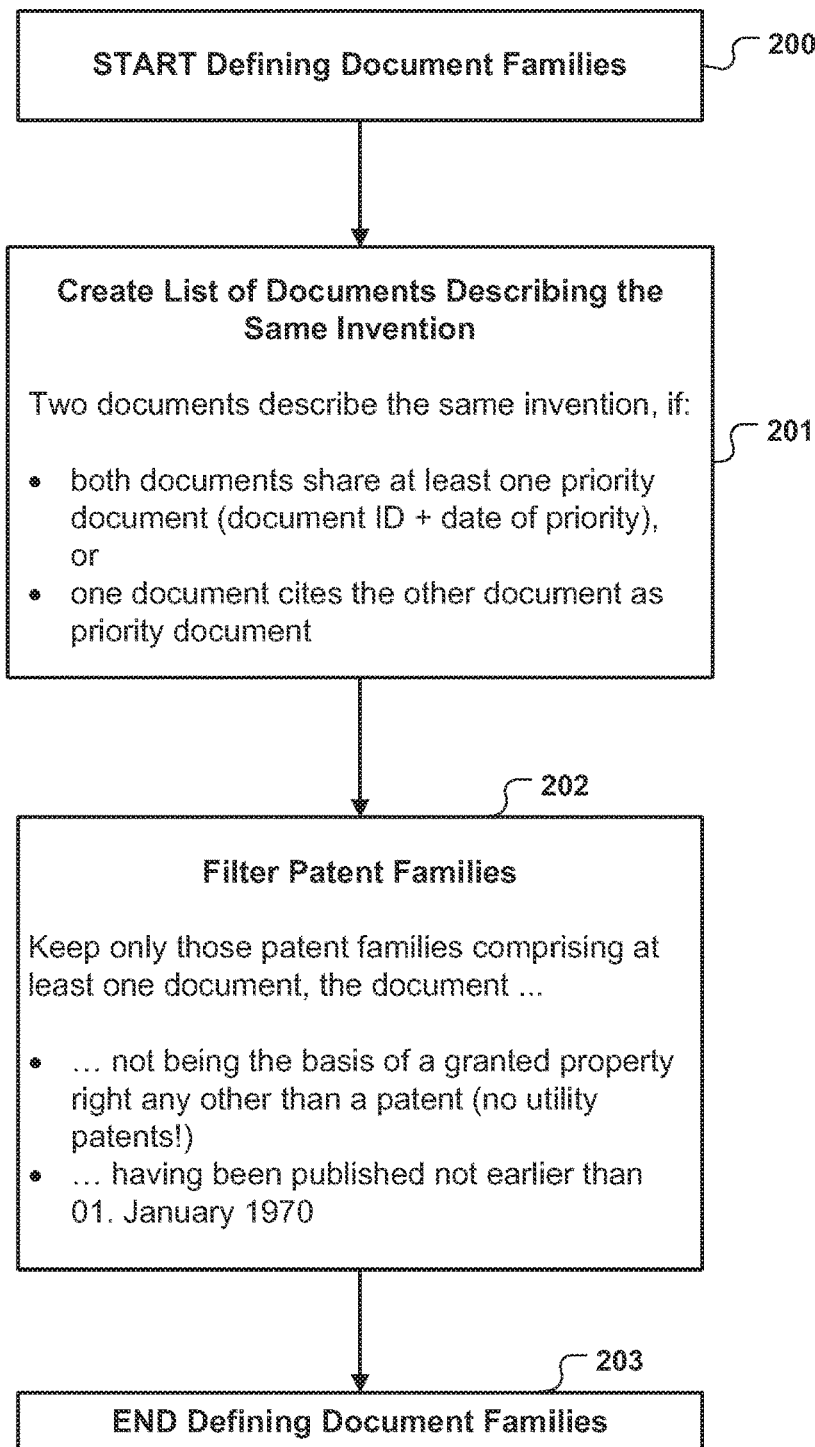
FIG. 2 is a flowchart illustrating the step of defining document families, e.g. patent families, in greater detail.

FIG. 2 illustrates the definition of document families as indicated in FIG. 1, step 101 in greater detail. The embodiment of the invention depicted in FIG. 2 describes the grouping of documents being patents to patent families.

After starting the definition of patent families in step 200, a list of documents, according to the described embodiment, patent documents, describing the same invention is created in step 201. Two documents describe the same invention and are assigned to one patent family, if a) both documents share at least one priority document, which means that it is checked whether the ID and the date of priority of the priority document referred to by both documents is identical, or b) one document cites the other document as priority document.

In step 202, the document families are filtered and only those patent families are kept which comprise at least one patent document which meets a list of quality criteria. Said at least one patent document must:

a) represent a patent document in the narrow sense of the word, including patents and patent applications but excluding utility patents and utility patent applications b) have been published not earlier than Jan. 1, 1970.

According to a preferred embodiment of the invention, all documents of the resulting filtered patent families remain in a the database irrespective of whether the documents individually meet the quality criteria.

The definition of document families, here described for the case of patent families, ends with step 203.

Figure 3:
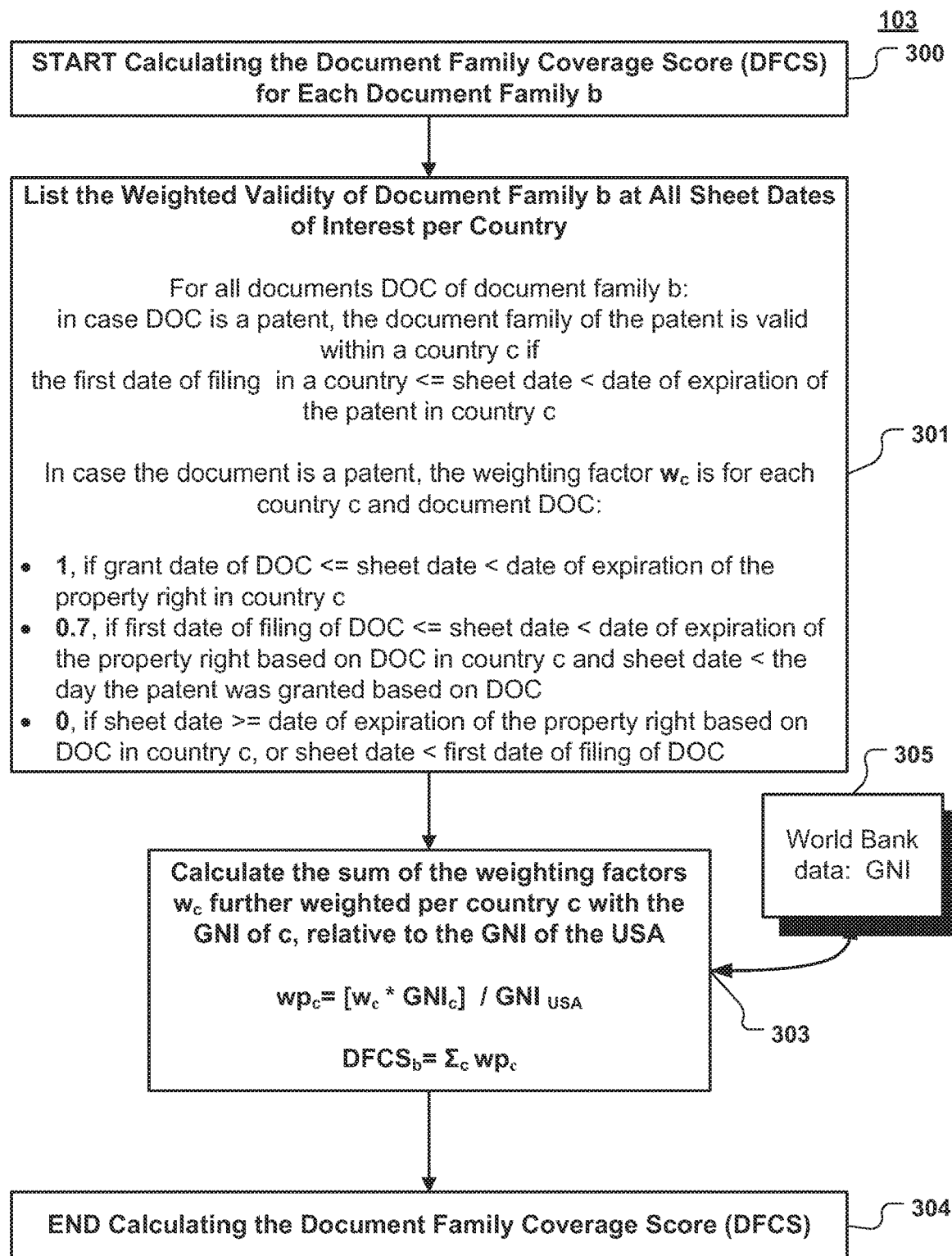
FIG. 3 is a flowchart illustrating the step of calculating the DFCS of a document family in greater detail.

FIG. 3 illustrates the calculation of the document family coverage score DFCS for each document family b as indicated in FIG. 1 by step 103 in greater detail. The calculation for the document family b starts with step 300 and ends with step 304 and is executed for all document families within a portfolio. The embodiment of the invention depicted in FIG. 3 calculates the DFCS values for patent documents. In case the documents whose relevance is to be quantified are not patent documents, the method will after minor adaptations e.g. for the determination of the validity status of a document within a country be applicable as well.

In step 301, the validity of all documents DOC of the document family b, here a patent family, is determined for all countries c for all sheet dates of interest according to the following rules:

In case the first date of filing DOC in a country c happened earlier than sheet date and if sheet date is earlier than the date of expiration of the patent in country c, then a document DOC is considered as valid in country c. As a result, document family b comprising DOC is also considered as valid in country c.

A list of sheet dates of interest may, for example, be December 31. of the years 1998-2003.

Each country c is assigned a weighting factor $w_c$, for each document DOC of document family b which is calculated as follows:

$w_c$ is 0, if the sheet date is later or identical to the date of expiration of the patent which was granted in country c based on DOC.

$w_c$ is 0, if the sheet date is earlier than the first date of filing DOC.

$w_c$ is 0.7, if the first date of filing DOC is earlier than or equal to sheet date and sheet date is earlier than the date of expiration of the property right based on DOC in country c and sheet date is earlier than the day the patent is granted.

$w_c$ is 1, if grant date of DOC is earlier than or equal to sheet date and sheet date is earlier than the expiration date of the patent granted on DOC in country c.

In the next step 303, the weighting factors $w_c$ of each country c and document DOC are further weighted according to the impact of this country. According to a preferred embodiment of the invention, this weighting is done by multiplying the weighting factor obtained for a particular country c in the previous step, which is either 0, 0.7 or 1, by a country specific weight indicating the significance of the country, e.g. its gross national income GNI. The obtained value is divided by the GNI of a reference country, e.g. the GNI of the USA, to obtain a relative, country specific weight of the impact of the invention in a particular country c in relation to a patent filed or granted in the USA:

$$wp_c = [w_c * GNI_c]/GNI_{USA}$$

The GNI figures represent external data and are derived according to preferred embodiments of the invention on an annual basis from the World Bank. According to further embodiments of the invention, said global economic key figures are replaced by figures which better represent the economic impact of a country in respect to a particular business or technology field, e.g. sales figures of the pharmaceutical industries or of automobile manufacturers.

The final DFCS value for patent family b is calculated by summing up for all countries c the weighted factors $wp_c$ obtained on the documents DOC of the document family:

$$DFCS_b = \Sigma_c wp_c.$$

To further improve the accuracy of the relevance quantification, further embodiments of the invention consider PCT and EP patent applications according to the following rules:

Pending EP-applications are treated as patent applications in all EPC states until either the patent is granted or the application is abandoned, depending on which of the two options takes place earlier.

WO-applications are considered as equivalent to patent applications in all PCT states within the first 40 month after the first date of filing.

If a national patent application exists in addition to a PCT or an EP application, the respective country is not considered twice.

Figure 4A:
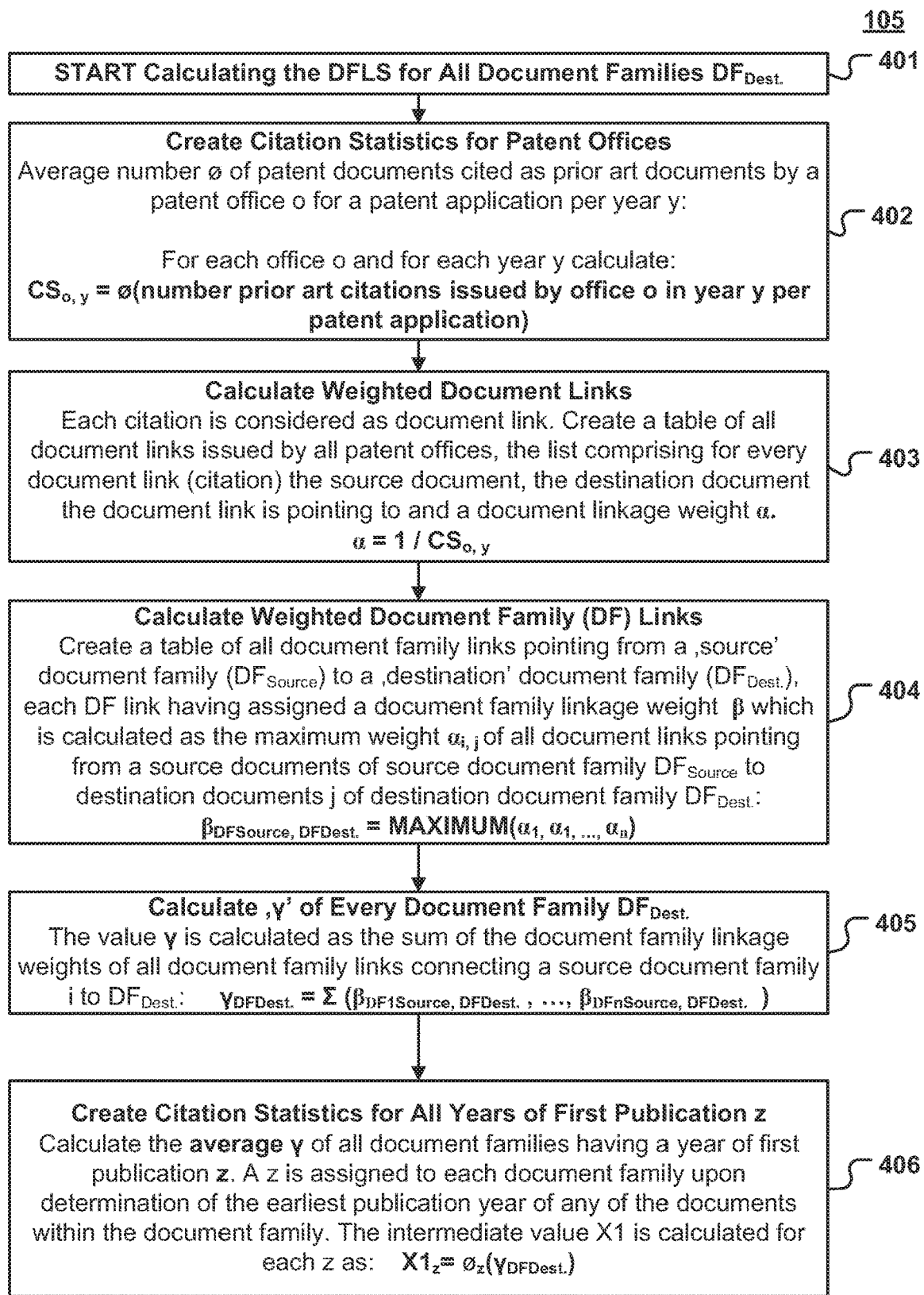
FIGS. 4*a-c* represent a flowchart spreading over multiple pages which illustrates the step of calculating the DFLS of a document family in greater detail.
Figure 4B:
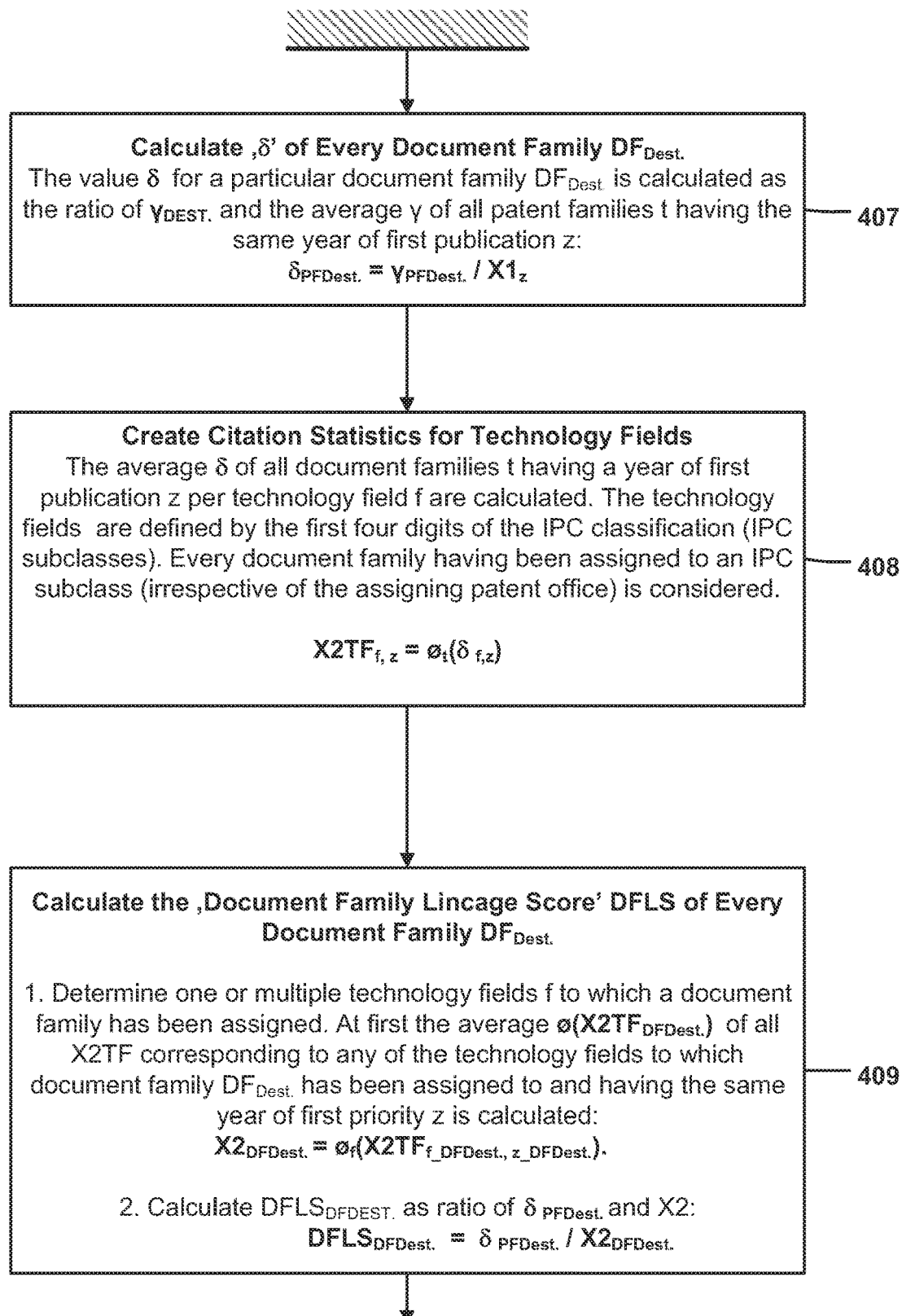
Figure 4C:
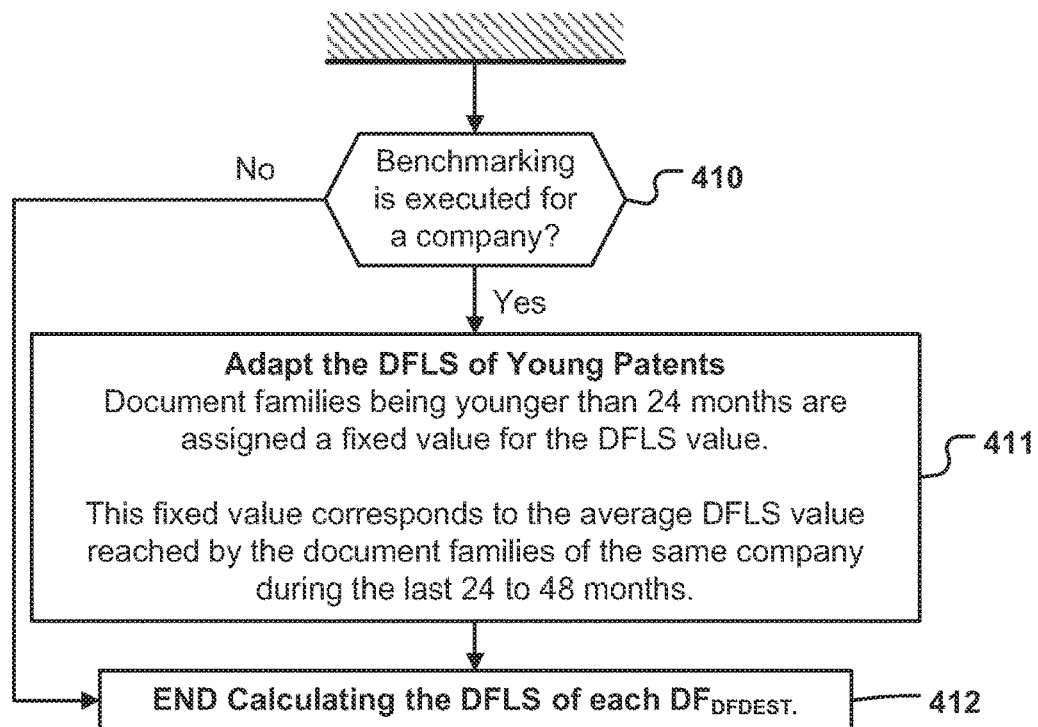

FIGS. 4a-c illustrate the calculation of the document family linkage score DFLS for all document families as indicated in FIG. 1 by step 105 in greater detail. The calculation starts in step 400 and ends in step 412. The embodiment of the invention depicted in FIGS. 4a-c calculates the DFLS values for patent documents.

In step 402, a statistics is created for every patent office about which sufficient data is available. In this step, the average number of patent documents cited as prior art documents by a patent office o for a patent application per year y is determined. The value obtained is referred to as $CS_{o,y}$ wherein o is indicative of the patent office and y of the year.

In step 403, all document links connecting documents contained in the totality of documents to be examined are determined and to every document link a document linkage weight $\alpha$ is assigned. A document link is a link connecting a source document with a destination document. According to a preferred embodiment of the invention, each prior art citation of a patent document issued for each patent document by a patent office is considered as a document link. A database table is created comprising all document links in association with its corresponding source document, destination document and document linkage weight $\alpha$. The document linkage weight $\alpha$ depends on the citation quality of the patent office issuing each link. The higher the number of citations issued by a patent office per patent document, the lower the relevance and quality of the citation in respect to a particular patent document. The value $\alpha$ is therefore determined for each document link based on the patent office issuing the link as $\alpha=1/CS_{o,y}$. The determination and weighting of document links is depicted graphically in greater detail in FIG. 5.

In step 404, all weighted document family links within the total set of examined document families are determined. A database table is created comprising all document family links. Each document family link entry of that table also comprises its corresponding source document family $DF_{Source}$, its destination document family $DF_{Dest.}$ and its document family linkage weight $\beta$. A document family acts as source document family being connected with a destination document family via a document family link if the source document family comprises at least one document linking to a document belonging to the destination document family. According to a preferred embodiment, the document family linkage weight $\beta$ is calculated as the MAXIMUM value of all document linkage values a connecting documents of the source document family with documents of the destination document family.

$$\beta_{DFSource,\ DFDest.} = \text{MAXIMUM}(\alpha_1, \alpha_2, \ldots, \alpha_n).$$

In step 405, the value $\gamma$ is calculated for every document family $DF_{Dest.}$. The value $\gamma$ is calculated as the sum of the document family linkage weights of all document family links connecting a source document family i with document family $DF_{Dest.}$.

$$\gamma_{DFDest.} = \Sigma_i \beta_{DFSource\_i,\ DFDest.}$$

Figure 5:
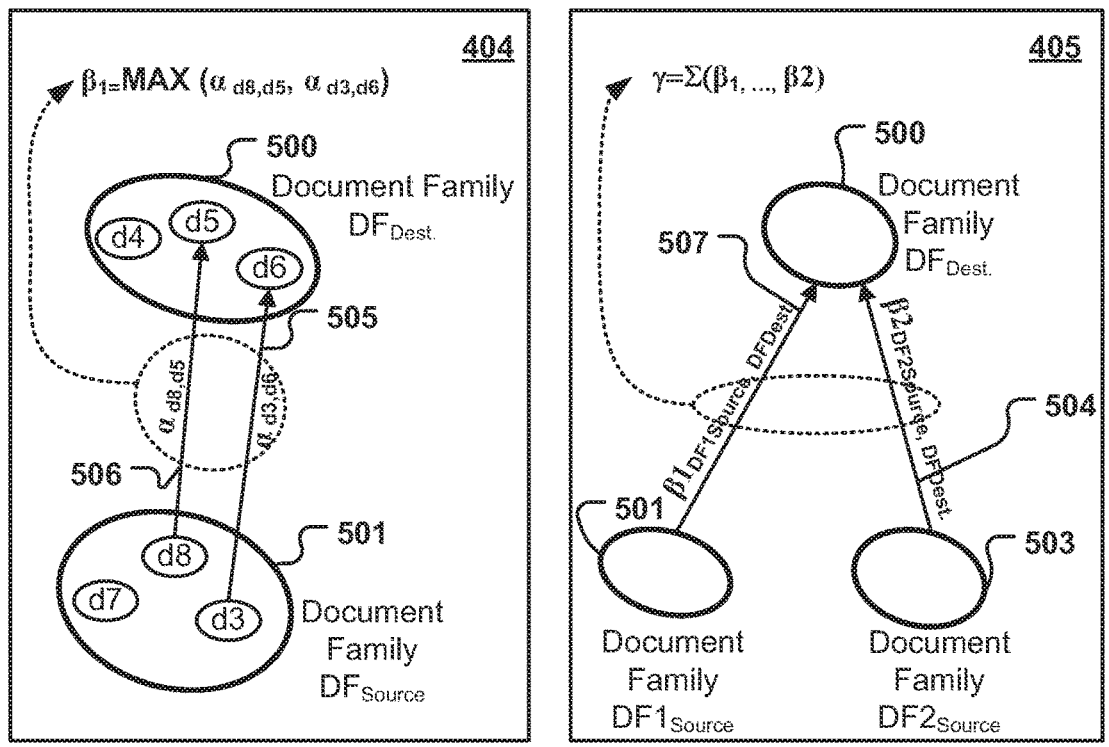
FIG. 5 illustrates the determination of document family linkage weights (step 404) and the value γ. (step 405) graphically.

The calculation of $\gamma_{DFDest.}$ is depicted graphically in greater detail in FIG. 5.

In step 406, a citation statistic for all years of first publication z is created. This task comprises the calculation of the average $\gamma$ of all document families having the same year of first publication z. Every document family is characterized by a year of first publication z which represents, for patent documents, the first year wherein any of the documents belonging to a document family was published. An intermediate value X1 is calculated for each year of first publication z and all $\gamma$ of all document families having a year of first publication z:

$$X1_z = \emptyset(\gamma_{DFDest.}).$$

According to the depicted embodiment of the invention, the document links are based on citations. The document family links are derived from the document links and are therefore also based on citations. Citation based relevance scores of documents have a strong bias towards older documents as older documents had a greater chance of becoming cited than recently published documents. Therefore, according to some embodiments, the intermediate value X1 is corrected for the last two years before the sheet date. To calculate X1 for the last two years, the average of $DF_{Dest}$ of the third year ahead of the sheet date is used for the calculation. A 'year' in this context is a time period of 12 month determined in relation to the current date, not a calendar year.

In step 407, the value $\delta$ is calculated for every document family $DF_{Dest.}$. The value $\delta_{DFDest.}$ is calculated as the ration of the $\gamma_{DFDest.}$ value and the average of all t patent families having the same year of first publication z:

$$\delta_{DFDest.} = \gamma_{DFDest.}/\emptyset(\gamma_{DF1}, \gamma_{DF2}, \ldots, \gamma_{DFt})$$

In step 408, a citation statistics is calculated for all technology fields f considered. The average $\delta$ of all document families having a year of first publication z per technology field f is calculated. The technology fields are defined by the first four digits of the IPC classification (IPC subclasses). Every document family having been assigned to an IPC subclass (irrespective of the assigning patent office) is considered.

An intermediate value $X2TF_{f,z}$ is calculated for each year of first publication z considered, e.g. the last 50 years from the current date, and for all technology fields f of interest. $X2TF_{f,z}$ is calculated as the average $\delta$ of all document families having a year of first publication z and having been assigned to the technology field f (a document family can have assigned one or multiple technology fields).

$$X2TF_{f,z} = \emptyset(\delta_{f,z})$$

In cases less than 200 document families exist for a particular technology field, the calculation of $X2TF_{f,z}$ is not based on an average value derived from the year of first publication z but rather from an average value based on multiple years.

In step 409, the document family linkage score DFLS is calculated for every document family $DF_{Dest.}$. The step comprises two sub-steps. At first, the one or multiple technology fields f to which $DF_{Dest.}$ has been assigned to is determined. The average value from all $X2TF_{f,z}$ values corresponding to technology fields having been assigned to document family $DF_{Dest.}$ and having the same year of first priority is calculated and referred to as intermediate value X2.

$$X2_{DFDest.} = \varnothing(X2TF_{f1\_DFDest.,z\_DFDest.}, X2TF_{f2\_DFDest.,z\_DFDest.}, \ldots, X2TF_{fn\_DFDest.,z\_DFDest.})$$

The $X2TF_{f1\_DFDest., z\_DFDest.}$, $X2TF_{f2\_DFDest., z\_DFDest.}$ values do not have to be calculated de novo in step 409, as said values have been calculated already for each technology field f and each year of first publication z in step 408. It is only required to retrieve the appropriate X2TF value for the technology fields and the year of first publication of document family $DF_{Dest.}$ whose DFLS is to be calculated.

In the next sub-step, the DFLS value of the document family $DF_{Dest.}$ is calculated as the ratio of $\delta_{DFDest.}$ and $X2_{DFDest.}$.

$$DFLS_{DFDest.} = \delta_{DFDest.}/X2_{DFDest.}$$

In decision 410 it is determined whether the benchmarking method is executed for a company or not. According to an embodiment of the invention, the user is provided with means, e.g. a GUI, to select between the two options 'YES: portfolio benchmarking for a company' and 'No'. In case the option 'Yes' is selected, a further step 411 is executed adapting the DFLS value calculated in step 409 for patent documents being younger than 24 month. Patent documents being younger than 24 month are assigned a predefined or calculated other value. Said other value is, for example, the average DFLS value calculated for document families held by the company for which the portfolio benchmarking is executing and having and whose age is between e.g. 24 to 48 month, the age of a patent document being calculated based on the filing date. In case the second option 'No' is selected, the calculation of the DFLS value of document family $DF_{Dest.}$ is terminated in step 412. The 'No' option may be preferentially selected if the portfolio benchmarking is executed for instances other than companies or for companies which do not own patent documents older than 24 month'.

The determination and weighting of document family links is depicted graphically in greater detail in FIG. 5.

FIG. 5 illustrates the steps 404, the determination and weighting of document links, and step 405, the determination and weighting of document family links, graphically. Step 404 is represented by the left block of the figure comprising a document families $DF_{Dest.}$ 500 and DF Source 501, 500 comprising the documents d4, d5 and d6, 501 comprising the documents d7, d8 and d3. A first document link 506 connects the source document d8 with the destination document d5. According to some embodiments of the invention, such a link may be derived by a patent office issuing a citation of patent document d5 as prior art document when examining patent document d8. A second document link 505 connects source document d3 to destination document d6. Linkage weight $\alpha_{d8,d5}$ is assigned to document link 506 and $\alpha_{d3,d6}$ is assigned to document link 505. In case document links 505 and 506 have been issued from different patent offices having different citation quality, the document links 505 and 506 have assigned two different document linkage weights $\alpha_{d3,d6}$ and $\alpha_{d8,d5}$.

According to further embodiments of the invention, the document linkage weight $\alpha$ is not calculated based on the citation quality of the patent office but rather on the citation quality of a patent examiner working at a patent office. Again, the higher the average number of prior art citations issued by a patent examiner per patent document, the lower is the quality and relevance of a single citation issued by said examiner. $\alpha$ is calculated analogously to the patent office based weighting, but instead of patent office specific scores patent examiner specific scores are used for the weighting.

Analogously, according to further embodiments of the invention, document links are weighted based on the average number of prior art patent document citations assigned to a patent document in a particular technology field. The higher said average, the lower is considered the quality of each single citation and the lower the weight of each single document link connecting documents of a particular technology field.

The weight $\beta1$ of a single document family link, indicated in FIG. 5 by the dashed ellipse surrounding the document links 505 and 506, is calculated as the maximum document linkage weight $\alpha$ of all document links connecting a source document in source document family 501 to a destination document in destination document family 500: $\beta1$ =MAXIMUM($\alpha_{d8,d5}$, $\alpha_{d3,d6}$).

The right box of FIG. 5 representing step 405 illustrates the calculation of $\gamma_{DFDest.}$ by summing up all document family linkage weights $\beta1$, $\beta2$ directing from a source document family $DF1_{Source}$ 501, $DF2_{Source}$ 503 to destination document family $DF_{Dest.}$ 500. The document family linkage weight $\beta1$ corresponds to document family link 507 while the document family linkage weight $\beta2$ corresponds to document family link 504.

$$\gamma_{DFDest} = \Sigma(\beta1, \beta2)$$

Figure 6:
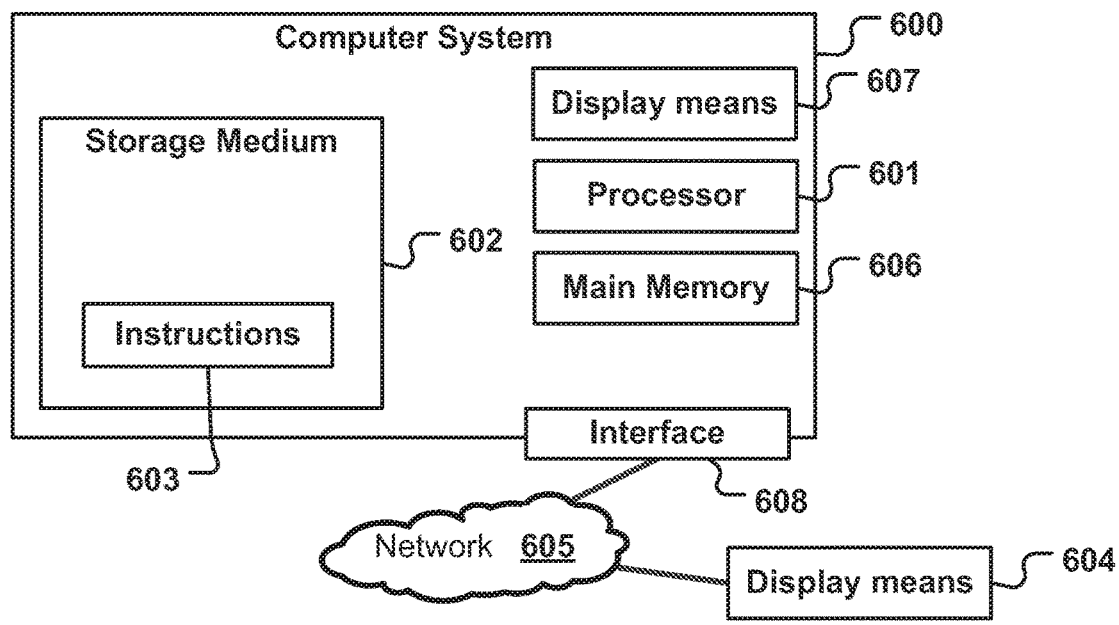
FIG. 6 is a block diagram of a computer system according to one embodiment of the invention.

FIG. 6 is a block diagram of a computer system 600 comprising a processor 601 and a computer readable storage medium 602.

While the machine-readable medium 602 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions 603 for execution by the machine and that cause the machine to perform any one or more of the methods of the present invention. The term "machine-readable medium" shall accordingly be taken to include, but not be limited to, solid-state memories, optical and magnetic media, and the like. The set of instructions may also reside, completely or at least partially, within the main memory and/or within the processor during their execution by the computer system 600, the main memory 606 and the processor 601 also constituting machine-readable media. The calculated aggregate score values and/or their visual representations may be displayed on a display 607 being part of the computer system, e.g. a screen, or be transmitted to the remote display 604 over a network 605 via the network interface 608 utilizing any one of a number of well-known transfer protocols (e.g., HTTP).

The computer-implemented method described herein requires physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The computer-readable instructions may be stored in a computer readable storage medium 602, such as, but not limited to, any type of disk including floppy disks, optical disks, CD-ROMs, and magnetic-optical disks, read-only memories (ROMs), random access memories (RAMs) such as dynamic RAM (DRAM), EPROMS, EEPROMs, magnetic or optical cards, or any type of media suitable for storing electronic instructions, and each coupled to a computer system bus.

The present invention is not described with reference to any particular programming language. It will be appreciated that a variety of programming languages may be used to implement the teachings of the invention as described herein.

Figure 7:
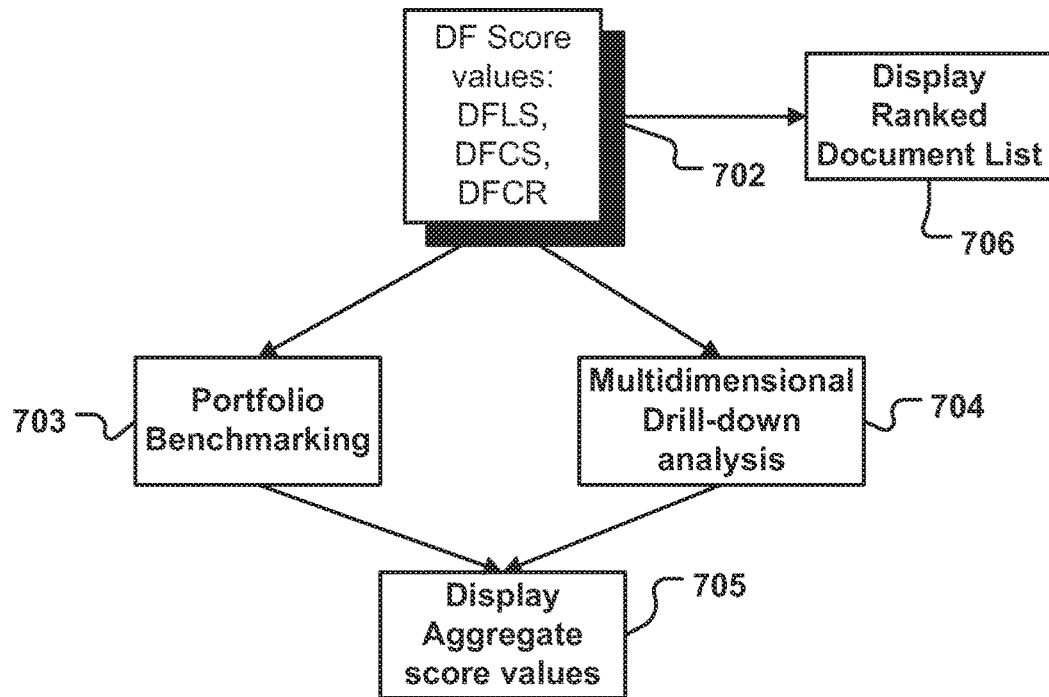
FIG. 7 is a flow chart illustrating possible use case scenarios of embodiments of the invention other than portfolio benchmarking.

FIG. 7 illustrates that the score values DFOLS, DFCS and DFCR shown in box 702 can be used in method 703 for portfolio benchmarking as described previously. In addition or alternatively, the document family score values can be used to rank all document families or the documents contained therein and to present in step 706 the user only the most relevant documents or document families e.g. on a screen of a computer. The document family scores may also be used in method 704 to execute a drill-down analysis, thereby determining aggregate score values of various subsets of document families, e.g. of all document families having a year of first priority 1997, being owned by company A and belonging to a particular technology field f. The aggregate score values obtained from the portfolio benchmarking or from the multidimensional-drill-down analysis can be displayed in dense form as a chart or color-encoded geographic map on a screen.

Figure 8:
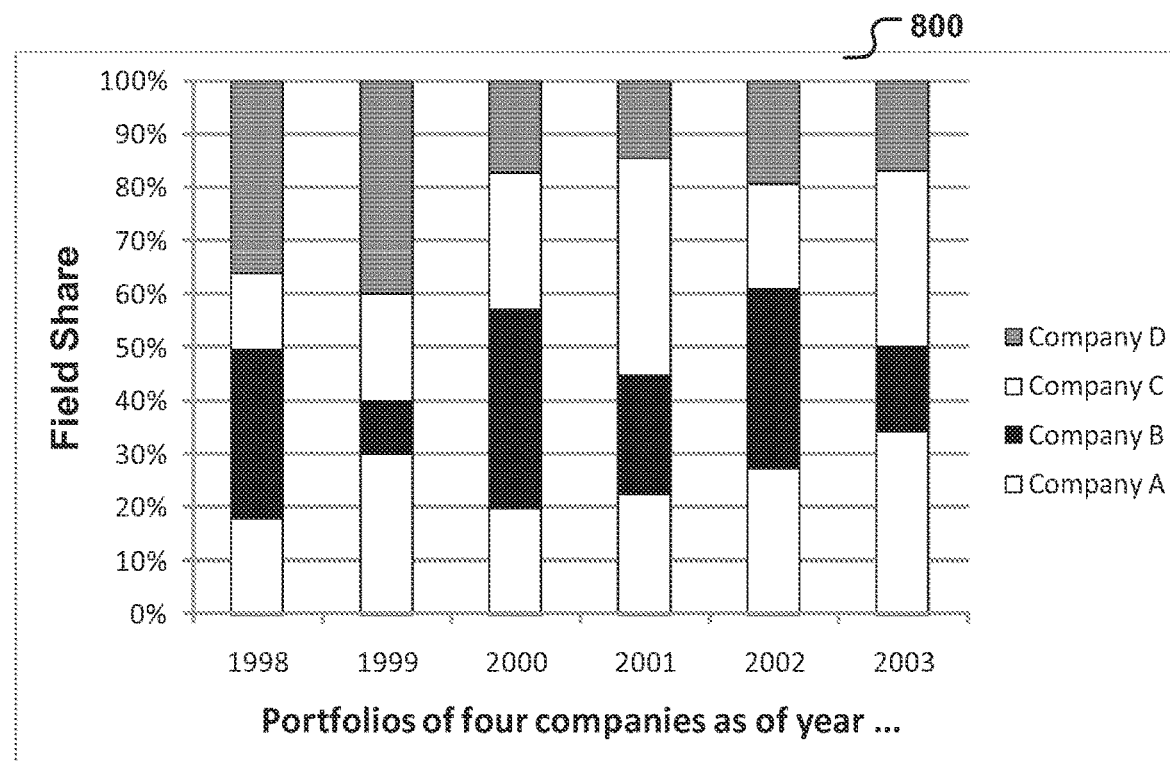
FIG. 8 is a bar chart illustrating the field share of four companies.

FIG. 8 depicts a bar chart being indicative of the field share of four companies A-D in the years 1998 to 2003 at a particular sheet date, e.g. December 31. The field share may be calculated for all technology fields available or for patent families belonging to a limited, preselected set of technology fields only. The pre-selection of technology fields before comparing the field share of various companies is advantageous, as the degree according to which companies are engaged in a particular technology field may vary and a large company owning a multitude of patens does not necessarily comprise a large document portfolio in every technology field the company is engaged in. The field shares of all document families belonging to all companies A-D and belonging to a particular technology field altogether yield a total share of 100%.

Figure 9:
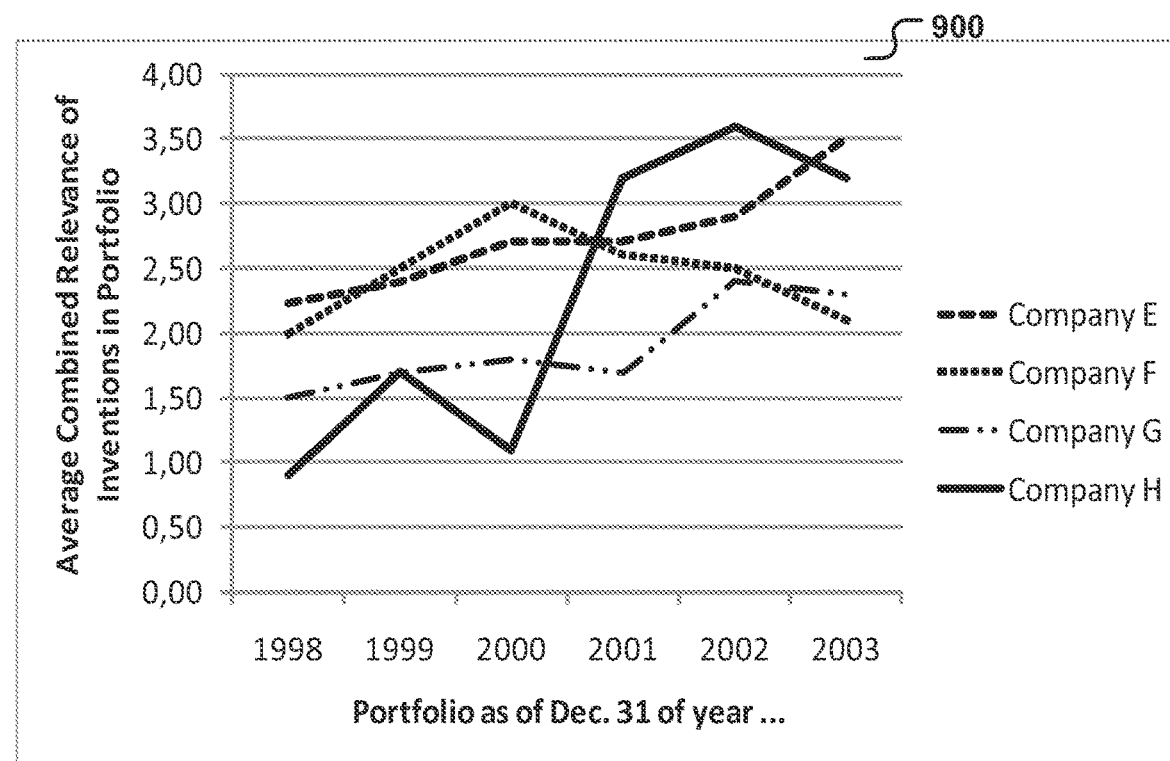
FIG. 9 is a line chart illustrating the average PFCI score values of all inventions within the portfolios of four companies.

FIG. 9 depicts a line chart being indicative of the average combined relevance of all inventions of four companies E-H in the years 1998 to 2003 at a particular sheet date, e.g. December 31. Each invention is represented by a patent family. By considering multiple years, the development of the average combined relevance of a patent portfolio can be monitored.

FIG. 10 depicts a table 1000 comprising multiple aggregate score values calculated for the patent portfolios of four companies I-L. The table comprises several columns for the field share 1002, the portfolio strength 1003, the portfolio size 1004, the average DFCR score value of all document families of a company 1005, the average DFLS value of all document families of a company 1007, and the average age of the inventions in the patent portfolio 1008. Column 1007 represents the size of the markets covered by patents of a company compared to the size of a reference market size, e.g. the US market size. The average combined relevance is calculated as the average of all DFCR scores of all patent families displayed in column 1005 is larger than the product of the average DFLS value of a company depicted in column 1006 and the average DFCS value of a company depicted in column 1007. These two numbers differ because companies systematically seek broader coverage for more relevant patents.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

ABBREVIATIONS

GNI Gross National Income
OLAP online analytical processing
DFCS document family coverage score
DFLS document family linkage score
DFCR document family combined relevance score
FSH field share
PST portfolio strength
PSI portfolio size
PLS portfolio linkage score
PCS portfolio coverage score
DOCDB EPO patent information resource
INPADOC-PRS INternational PAtent DOCumentation

LIST OF REFERENCE NUMERALS 200-203 steps
300-304 steps
305 GNI figures of World Bank
400-412 steps
500 document family $DF_{Dest.}$
501 document family $DF1_{Source}$
503 document family $DF2_{Source}$
504 document family link
505 document link from d3 to d6
506 document link from d8 to d5
507 document family link
600 computer system
601 processor
602 storage medium
603 instructions
604 remote display means
605 network
606 main memory
607 display means 608 network interface
702 list of document family scores
703-704 steps
800 bar chart: field share
900 line chart: avg. DFCR
1000 table comprising mult. aggreg. scores
1001 company column
1002 FSH column
1003 PST column
1004 PSI column
1005 avg. DFCR column
1006 avg. DFLS column
1007 avg. DFCR column
1008 avg. age column

The invention claimed is:

1. A computer implemented method comprising:
assigning documents to one or more document families, each document family comprising one or more documents, wherein each document is selected from a group consisting of a patent document and a patent application document;
calculating, for each document family, a document family coverage score DFCS, the document family coverage score being indicative of the validity of the document family in a category, whereby the validity is calculated from one or more first properties of each document belonging to said document family, and wherein the DFCS of each document family is calculated by summing up weights wc assigned to each document of the document family, each weight wc being indicative of a significance of a country c;
calculating, for each document family, a document family linkage score DFLS, said document family linkage score being calculated by
finding one or more document links, each document link connecting a source document to a destination document, each destination document belonging to said document family, each source document belonging to another document family;
finding one or more document family links, whereby each document family link connects a source document family with said document family, said document family acting as destination document family, whereby the existence of each document family link is derived from the one or more found document links and wherein the DFLS is derived from the existence and weight of the one or more found document family links; and
calculating, for each document family, a document family combined relevance score DFCR by multiplying the document family coverage score DFCS and the document family linkage score DFLS having been calculated for each document family.

2. The computer implemented method according to claim 1, further comprising:
grouping document families into one or more portfolios, each portfolio comprising one or more document families; and
densely displaying, for each document portfolio, an aggregated view in which a plurality of data values are displayed in a summarized form on a graphical user interface with the summarized form providing a visualization of relationships between all documents in the document portfolio, the aggregated view comprising or being derived from one or more aggregated score values, the one or more aggregated score values being calculated by applying an aggregating function on the DFCR, the DFLS, or the DFCS value of the one or more document families of said portfolio.

3. The computer implemented method according to claim 1, wherein the categories are geographic territories and the first properties are countries.

4. The computer implemented method according to claim 1, wherein each weight wc is multiplied with a value being indicative of a significance of the country c and the DFCS of each document family b at a sheet date is calculated as DFCS (document family b)=$\Sigma([Wc*GNIc]/GNI_{REF})$,
wherein Wc is a country specific weight of country c, country c having been assigned to the document;
wherein $\Sigma$ indicates the sum over all documents of a document family and for all countries c considered;
wherein GNIc is a parameter being indicative of a significance of country c; and
wherein $GNI_{REF}$ is a reference parameter being indicative of a significance of a reference country REF.

5. The computer implemented method according to claim 1, wherein each value being indicative of a significance of a country can be replaced by a user-specific value, and wherein a reference parameter $GNI_{REF}$ can be selected or specified by the user via the graphical user interface, wherein the weight wc is indicative of a legal status of the document, wherein said legal status is selected from the group consisting of a valid patent status, an expired status and a pending legal status,
wherein a patent document has valid patent status in a country if the granting date of the patent<=sheet date<date of expiration of the patent,
wherein the document has pending legal status in a country if:
the date of filing the document is<=sheet date, and if: sheet date is<date of expiration of the document; and if the granting date>sheet date
wherein the document has expired status in a country if sheet date>=expiration date or wherein sheet date<date of filing of the document;
and wherein the weight wc for pending status is a score value indicating the probability that a patent will be granted for the document.

6. The computer implemented method according to claim 1, where the document links are weighted and are indicative of citations of prior art patent documents, the method further comprising the steps:
calculating, for each document link, a document linkage weight $\alpha$, the document linkage weight being a quality measure of the document link;
calculating, for each document family link, a document family linkage weight $\beta$, the document family linkage weight $\beta$ being a derivative of the document linkage weights a of all document links connecting source documents of one source document family with destination documents of one destination document family;
calculating, for each destination document family, an aggregate value $\gamma$ as a derivative of all document family linkage weights $\beta$ of all document family links connecting a source document family with the destination document family; and
returning the calculated aggregate value $\gamma$ as DFLS value.

7. The computer implemented method according to claim 6, wherein the document linkage weight $\alpha$ is selected from the group comprising:
a patent office specific quality value, said patent office specific quality value being indicative of the quality of the citations issued by the patent office, wherein the document link quality value is inversely proportional to the average number of cited documents of said patent office;

a patent examiner specific quality value, said patent examiner specific quality value being indicative of the quality of the citations issued by the patent examiner, wherein the document link quality value is inversely proportional to the average number of cited documents of said patent examiner;

a citing authority specific quality value, said citing authority specific quality value being indicative of the authority having cited a particular document, said authority being in particular an inventor, an examiner or a 3rd party;

a citation category of the destination document;

a property of the destination document, said property being indicative of the relevance of said destination document to the user;

a property of the source document, said property being indicative of the relevance of said source document to the user;

a quality value being derived from the technology field of the source document, said quality value being inversely proportional to the average number of documents cited by a document having assigned said technology field; and a quality value being derived from the technology field of the source document and the technology field of the destination document, said quality value being derived from a predefined or dynamically calculated similarity score, the similarity score being indicative of the similarity of the technology field of the source document and the technology field of the destination document.

8. The computer implemented method according to claim 6, wherein each document family linkage weight $\beta_{DFSource, DFDest}$ is equal to the maximum document linkage weight MAX($a_{ALL}$);
the average document linkage weight AVG($a_{ALL}$);
the median document linkage weight MEDIAN($a_{ALL}$);
the summed-up document linkage weight SUM($a_{ALL}$); or
the logarithmic document linkage weight being calculated as ln(N+$a_{AGG}$) or log(N+$a_{AGG}$), wherein N is a natural integer >0, wherein $a_{ALL}$ represents all document linkage weights of all document links connecting source documents belonging to the document family $DF_{source}$ with destination documents belonging to the destination document family DFDest and wherein $a_{AGG}$ represents a data value having been calculated by aggregating all of said document linkage weights $a_{ALL}$.

9. The computer implemented method according to claim 6, wherein the documents are patent documents, wherein the document links are citations, and wherein the document linkage weight $a_{d1, d2}$ is determined for each document link by:

determining the average number of prior art citations $CS_{o,y}$ issued by a patent office o per patent document and per time period z;

calculating for each document link the document linkage weight $a_{d1,d2}$ as $a_{d1,d2}=1/CS_{o,z}$, wherein o indicates the patent office issuing the citation, the citation corresponding to the document link to be weighted, and wherein z indicates the time period z in which the citation was issued by the patent office.

10. The computer implemented method according to claim 6, wherein the step of calculating the aggregate value $y_{DFDest}$ comprises in addition the execution of a normalization step, the normalization step comprising:

calculating, for each time period z of a set of time periods $z_1, \ldots z_k$ an intermediate value $X1_z$, the intermediate value $X1_z$ being the arithmetic mean of the aggregate value y of all document families whose status depends on a date lying within the time period z, wherein the date is selected from the group comprising the publication date of the earliest published document belonging to the document family;

the priority date of the patent family;

the filing date of the earliest filed patent document belonging to the document family; and the earliest date of receiving patent protection for any of the patent documents belonging to the document family;

determining a normalized aggregated value $\delta_{DFDest}$ of each document family $DF_{Dest}$ whose status depends on a date lying within the time period z, wherein $\delta_{DFDest}=y_{DEDest}/X1_z$;

returning $\delta_{DFDest}$ as DFLS value of document family $DF_{Dest}$.

11. The computer implemented method according to claim 10, wherein the normalization is executed in addition in respect to at least one field f, the method further comprising the steps:

determining one or more fields f1, . . . , fv having been assigned to the one or more document families;

calculating, for each field f1, . . . , fv and for each time period z1, . . . zk an intermediate $X2TF_{f,z}$ value, the intermediate $X2TF_{f,z}$ value being calculated as the average of all normalized aggregate values $\delta_{DFDest,f,z}$ of all document families $DF_{Dest,f,z}$ having been assigned to field f and whose status depends on the same kind of date, the date lying within the time period z;

calculating, for each destination document family $DF_{Dest}$, an intermediate value $X2DF_{Dest}$, wherein $X2DF_{Dest}=\emptyset(X2TF_{f1,z}, \ldots, X2TF_{fm,z})$, whereby the intermediate values $X2TF_{f1,z}, \ldots, X2TF_{fm,z}$ are intermediate values having been calculated for each field f1, . . . , fm, the fields f1 . . . , fm each having been assigned to the document family $DF_{Dest}$;

calculating the DFLS value for each document family $DF_{Dest}$ by dividing $\delta DF_{Dest}$ by $X2_{DFDest}$.

12. The computer implemented method according to claim 6, further comprising the steps:

determining one or more fields $f_1, \ldots, f_v$ having been assigned to the one or more document families;

calculating, for each field $f_1, \ldots, f_v$ and for each time period z1, . . . zk an intermediate $X2BTF_{f,z}$ value, the intermediate $X2BTF_{f,z}$ value being calculated as the average of all aggregate values $y_{DFDest,f,z}$ of all document families $DF_{Dest,f,z}$ having assigned the field f and whose status depends on the same kind of date, the date lying within the time period z;

calculating, for each destination document family DFFDest, an intermediate value $X2BDF_{Dest}$, wherein $X2BDF_{Dest}=\emptyset(X2BTFf_{1,z}, \ldots, X2BTF_{fm,2})$, whereby the intermediate values $X2BTF_{f1,z}, \ldots, X2BTF_{fm,z}$ are intermediate values having been calculated for each field f1, . . . , fm, the fields f1, . . . , fm each having been assigned to the document family $DF_{Dest}$;

calculating the DFLS value for each document family $DF_{Dest}$ by dividing $y_{DFDest}$ by $X2BDF_{Dest}$.

13. The computer implemented method according to claim 1, wherein the aggregated score value is selected from a group comprising:
- a field share value FSH, the field share value being calculated for said portfolio for one field f, whereby a field is a property of a document family and wherein each document family has assigned at least one field, the field share value FSH being calculated for said field f by:
  - calculating a first sum as the sum of all DFCR values of all document families having assigned said field f and belonging to said portfolio;
  - calculating a second sum as the sum of all DFCR values of all document families having assigned said field f and belonging to a superset of document families, said superset of document families comprising said portfolio;
  - calculating the ratio of the first and the second sum and using said ratio as field share value FSH;
- a portfolio size PSI, wherein the portfolio size of each portfolio is calculated as the number of document families within the portfolio having a DFCS value larger than 0;
- a portfolio strength PST, wherein the portfolio strength of each portfolio is calculated as the sum of the DFCR score values of all document families within the portfolio;
- a portfolio linkage score PLS, wherein the portfolio linkage score is calculated for each portfolio as the average of the DFLS values of all document families within the portfolio having a document family coverage score value larger than 0;
- a portfolio coverage score PCS, wherein the portfolio coverage is calculated for each portfolio as the average of the document family coverage scores of all document families within the portfolio having a document family coverage score value larger than 0.

14. The computer implemented method according to claim 1, wherein document families sharing one or more first or second property values or value ranges are grouped into the same portfolio, said first or second properties being selected from the group comprising:
- a technology field;
- a business field;
- a company owning the document;
- a document type;
- a document kind code;
- a organizational subunit of a company owning or creating the document;
- a branch of a company owning the document;
- a geographic region of origin or validity of the document;
- a status of the document;
- a patent office;
- a publisher or journal;
- the topic of the text of the document;
- a patent examiner;
- a time period;
- an IPC-class or sub-class;
- a bibliographic feature such as the name of an author or an inventor; and
- a feature having been determined by a clustering algorithm applied on the document data objects, wherein via each of said first or second properties one or more document portfolios can be specified upon which the aggregating function can be applied.

15. The computer implemented method according to claim 14,
- wherein the document families within each of the one or more document portfolios are iteratively grouped into second-, third-, fourth- or nth-order document-family sub-sets, thereby building a hierarchy of document-family sub-sets;
- wherein the first or second property shared by the document families within each document-family sub-set is different in each level of the hierarchy of document-family sub-sets; and
- wherein an aggregated score value is calculated for any document family sub-set of the document family sub-set hierarchy.

16. The computer implemented method according to claim 15, wherein the step of displaying, for each document portfolio, an aggregated score value further comprises the steps:
- providing the user with means to select a document-family sub-set at an arbitrary level of the hierarchy of document family sub-sets; and
- displaying, via the graphical user interface, the document families or documents contained within the selected sub-set of document families, the displayed documents or document families being ranked according to any of the document family score values DFCR, DFLS, DFCS or derivatives thereof.

17. A non-transitory computer readable storage medium containing instructions that when executed by a processor cause the processor to perform operations comprising:
- assigning documents to one or more document families, each document family comprising one or more documents, wherein each document is selected from a group consisting of a patent document and a patent application document;
- calculating, for each document family, a document family coverage score DFCS, the document family coverage score being indicative of the validity of the document family in a category, whereby the validity is calculated from one or more first properties of each document belonging to said document family, and wherein the DFCS of each document family is calculated by summing up weights we assigned to each document of the document family, each weight wc being indicative of a significance of a country c;
- calculating, for each document family, a document family linkage score DFLS, said document family linkage score being calculated by
  - finding one or more document links, each document link connecting a source document to a destination document, each destination document belonging to said document family, each source document belonging to another document family;
  - finding one or more document family links, whereby each document family link connects a source document family with said document family, said document family acting as destination document family, whereby the existence of each document family link is derived from the one or more found document links and wherein the DFLS is derived from the existence and weight of the one or more found document family links; and
- calculating, for each document family, a document family combined relevance score DFCR by multiplying the document family coverage score DFCS and the document family linkage score DFLS having been calculated for each document family.

18. The computer implemented method according to claim 17, where the document links are weighted and are indicative of citations of prior art patent documents.

\* \* \* \* \*